US012675959B2

(12) United States Patent
Imai

(10) Patent No.: US 12,675,959 B2
(45) Date of Patent: Jul. 7, 2026

(54) CONTENT MANAGEMENT SYSTEM AND CONTENT MANAGEMENT METHOD

(71) Applicant: CANON KABUSHIKI KAISHA, Tokyo (JP)

(72) Inventor: Yasuhiro Imai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 18/611,869

(22) Filed: Mar. 21, 2024

(65) Prior Publication Data

US 2024/0331316 A1     Oct. 3, 2024

(30) Foreign Application Priority Data

Mar. 28, 2023     (JP) ................................. 2023-051529

(51) Int. Cl.
*G06T 19/00*          (2011.01)
*G06K 7/14*           (2006.01)
(52) U.S. Cl.
CPC .......... *G06T 19/006* (2013.01); *G06K 7/1417* (2013.01)

(58) Field of Classification Search
None
See application file for complete search history.

(56) References Cited

U.S. PATENT DOCUMENTS

| | | | | |
|---|---|---|---|---|
| 11,138,807 B1* | 10/2021 | Inha | ...................... | G06T 15/506 |
| 2002/0040327 A1* | 4/2002 | Owa | .................. | G06Q 30/0601 |
| | | | | 705/26.1 |
| 2009/0204628 A1* | 8/2009 | Bhogal | .................. | G06Q 90/00 |
| | | | | 707/999.102 |
| 2024/0333877 A1 | 10/2024 | Imai | | |

FOREIGN PATENT DOCUMENTS

JP          2021-081943 A     5/2021

* cited by examiner

*Primary Examiner* — Robert J Craddock
(74) *Attorney, Agent, or Firm* — Venable LLP

(57) ABSTRACT

A system manages virtual content in association with a purchaser of the virtual content, as the virtual content management, when a code corresponding to the virtual content is detected by a terminal, further associates a feature amount acquired from a real space by the terminal with the virtual content, and controls the terminal to project the virtual content into a field of view of a user of the terminal.

3 Claims, 12 Drawing Sheets

Figure 4:
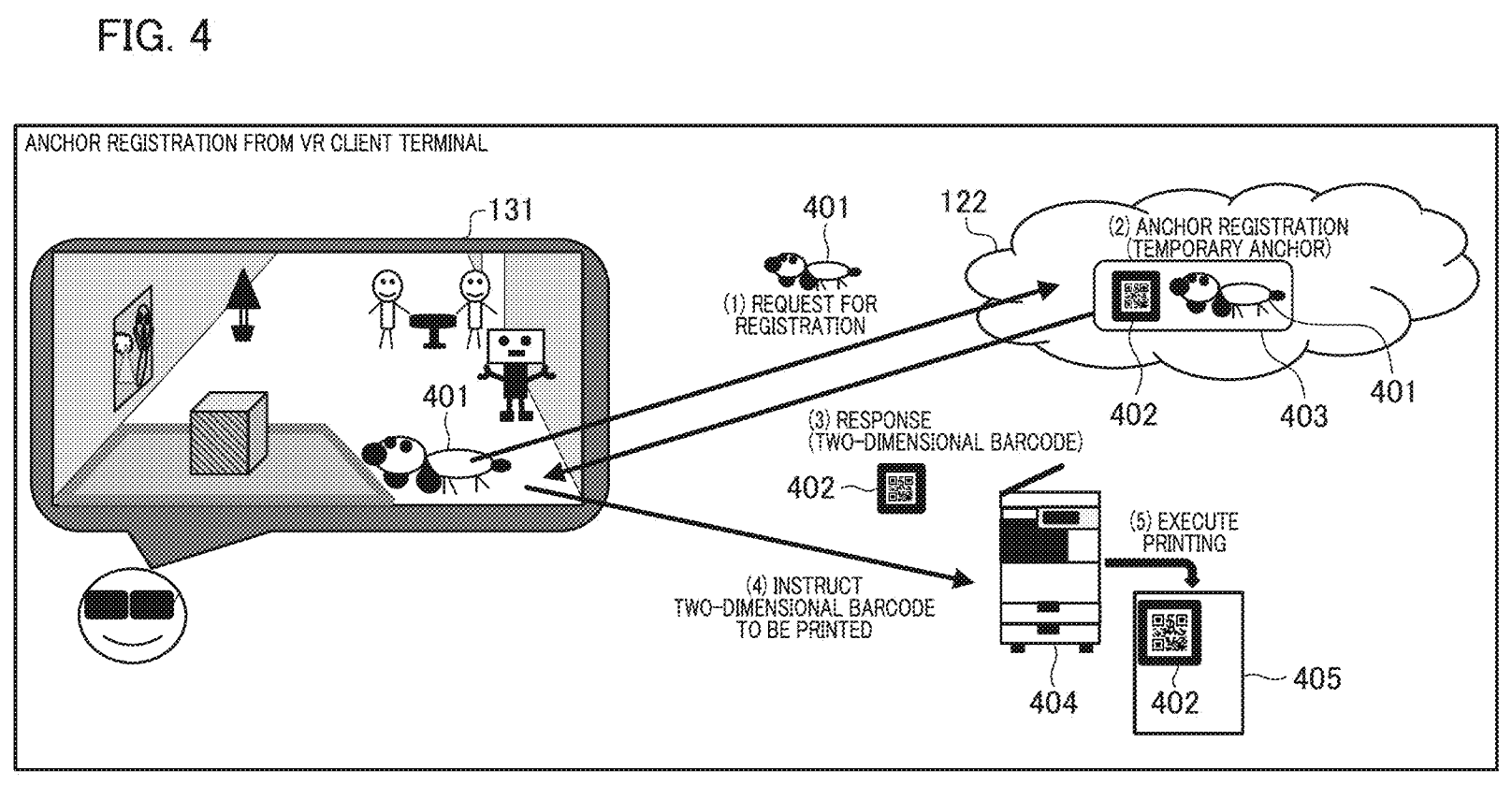

ANCHOR REGISTRATION FROM VR CLIENT TERMINAL

122

401

(1) REQUEST FOR REGISTRATION (2) ANCHOR REGISTRATION (TEMPORARY ANCHOR)

401

403

402

(3) RESPONSE (TWO-DIMENSIONAL BARCODE)

402

(4) INSTRUCT TWO-DIMENSIONAL BARCODE TO BE PRINTED (5) EXECUTE PRINTING

CONTENT MANAGEMENT SYSTEM AND CONTENT MANAGEMENT METHOD

BACKGROUND OF THE INVENTION

Field of the Invention

The present disclosure relates to a technology of managing virtual content.

Description of the Related Art

In recent years, extended reality (XR) (hereinafter referred to as "XR"), which is a technology that provides users with a pseudo experience obtained by combining a real space and a virtual space, has been attracting attention. XR is a general term for virtual reality (VR) (hereinafter referred to as "VR"), augmented reality (AR) (hereinafter referred to as "AR"), mixed reality (MR) (hereinafter referred to as "MR"), and the like. In addition, virtual spaces, services, and the like that utilize XR are called metaverses, and are being used not only for entertainment such as games, but also for business such as virtual offices and VR conference rooms. Note that, it is assumed in the following description that the concept of MR includes the concept of AR, considering that MR is a technology developed from AR.

Additionally, there is a technology for sharing a video being played on a terminal with another terminal. As such a technology, for example, an image sharing system disclosed in Japanese Unexamined Patent Application, First Publication No. 2021-81943 can be included. This image sharing system generates an AR image on a tablet terminal, transmits the AR image to a PC, and displays the AR image on a part of the VR image on goggles connected to the PC. Additionally, this image sharing system displays the VR image displayed on goggles connected to the PC as part of the AR image on the tablet terminal.

However, an image sharing system according to Japanese Unexamined Patent Application, First Publication No. 2021-81943 does not make it possible to use content corresponding to virtual content in a real space when the virtual content can be used in a virtual space.

Therefore, the present disclosure makes it possible to use content corresponding to virtual content in a real space when the virtual content can be used in a virtual space.

SUMMARY OF THE INVENTION

A content management system of the present disclosure includes one or more memories storing instructions, and one or more processors executing the instructions causing the content management system to execute content management of managing virtual content in association with a purchaser of the virtual content, wherein, as the content management, when a code corresponding to the virtual content is detected by a terminal, a feature amount acquired from the real space by the terminal is further associated with the virtual content, and the terminal executes control to project the virtual content into a field of view of a user of the terminal.

Further features of the present invention will become apparent from the following description of exemplary embodiments (with reference to the attached drawings).

BRIEF DESCRIPTION OF THE DRAWINGS

FIG. 1 is a diagram which shows an example of a system according to an embodiment.

FIG. 4 is a diagram for describing an example of processing in which the VR client terminal requests registration of an anchor from the MR space management system and the MR client terminal acquires the anchor in the embodiment.

FIG. 5 is a diagram for describing an example of processing in which the VR client terminal requests the registration of an anchor from the MR space management system and the MR client terminal acquires the anchor in the embodiment.

DESCRIPTION OF THE EMBODIMENTS

Figure 2:
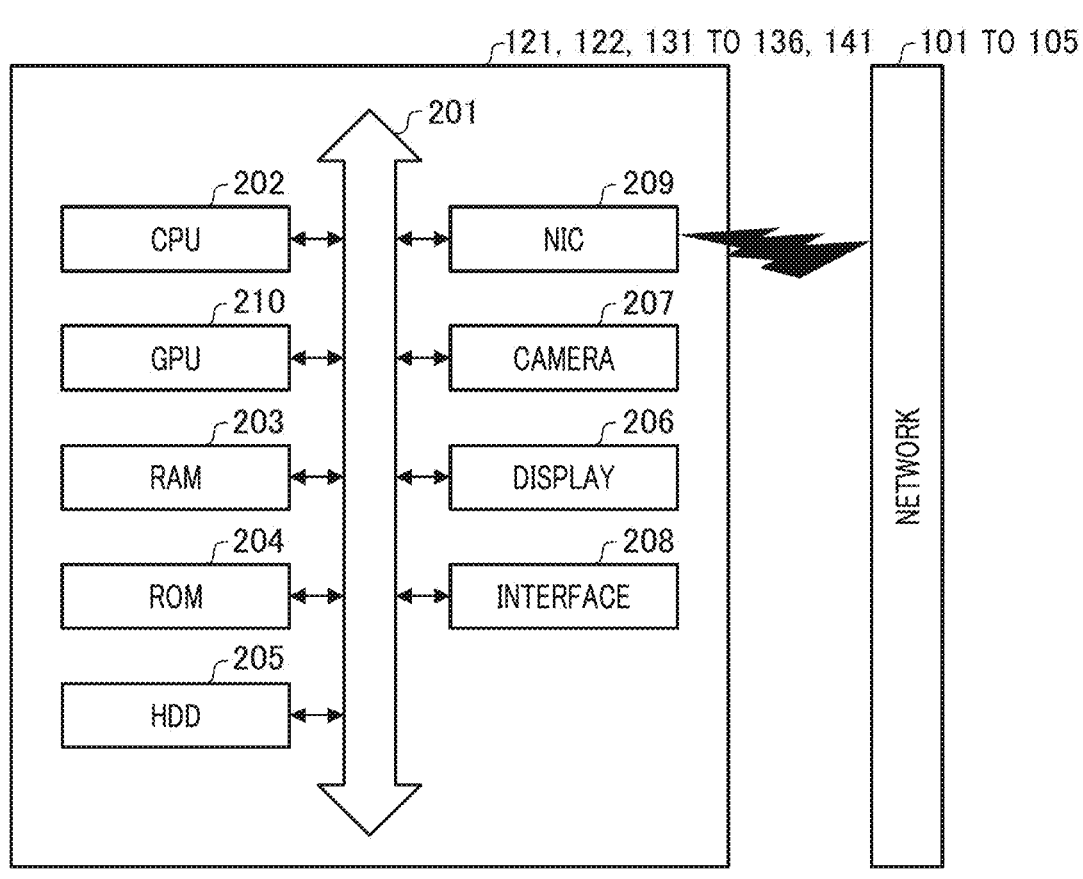
FIG. 2 is a diagram which shows an example of a configuration of hardware that realizes a VR space management system, an MR space management system, a function providing service, a VR client terminal, or an MR client terminal according to the embodiment.

In a VR space, which is a virtual reality space, each user wears a head mounted display (HMD) for VR, and communicates with other users' avatars in the VR space through the head mounted display for VR, just like in a real space. In addition, digital content in the VR space includes not only the avatar of the user described above, but also virtual content such as digital content that is a user interface (UI) having a specific function. For example, a virtual pet such as a virtual pet having a function of moving around and growing, or a virtual pet such as a pet avatar is an example of such virtual content.

A virtual pet can be purchased at a digital content sales site. The purchased virtual pet is managed by a VR space management system such as a cloud system that manages the VR space and VR content of the VR space. Then, the VR head mounted display accesses the VR server, and thereby the virtual pet can be used in the VR space. At this time, the virtual pet, which plays a role of a user interface, acquires the functions provided in the VR space by accessing services that provide functions such as moving around and growing, and causes them to be reflected in an operation of the virtual pet.

Moreover, in the MR space, which is a mixed reality space, each user wears a head mounted display for MR, and each user disposes and operates virtual content in the real space. In the system that realizes an MR space, there is a cloud system that associates and manages virtual content disposed in the real space and a feature amount in the real space captured by a camera, or the like. Note that, hereinafter, the cloud system will be referred to as an MR server. By capturing the real space that matches the feature amount managed by the MR server using a camera of the head mounted display for MR, it is possible to view the virtual content managed in association with the feature amount using the head mounted display for MR. At this time, by using an image marker such as a photograph, an illustration, and a two-dimensional barcode (QR code) as the feature amount described above, it is possible to view the same virtual content even when a plurality of terminals are located far apart from each other. Note that, this marker will hereinafter be referred to as an MR marker.

In addition, the image sharing system according to Japanese Unexamined Patent Application, First Publication No. 2021-81943 can share a video with an MR compatible device or a VR compatible device of another user when a user is referring to a video with virtual content disposed in the real space using an MR compatible device. In addition, this image sharing system makes it possible to share AR images generated by an AR compatible device with a VR compatible device, and to share VR images generated by the VR compatible device with the AR compatible device.

EMBODIMENTS

Figure 1:
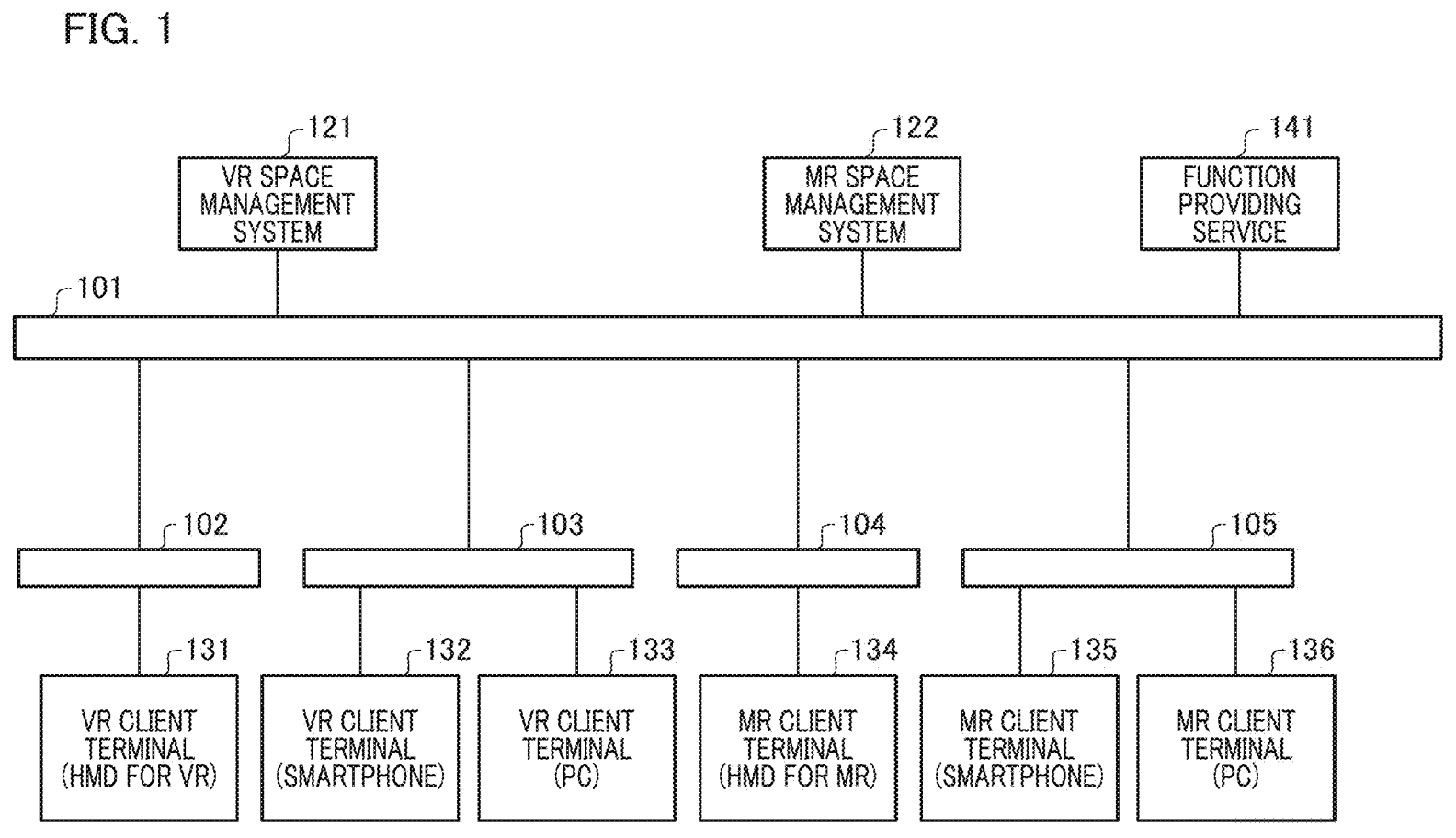

Embodiments of the present disclosure will be described below with reference to the drawings. FIG. 1 is a diagram which shows an example of a system according to an embodiment. As shown in FIG. 1, the system according to the embodiment includes a VR space management system 121, an MR space management system 122, a function providing service 141, a VR client terminal 131, a VR client terminal 132, a VR client terminal 132, an MR client terminal 134, an MR client terminal 135, and an MR client terminal 136.

As shown in FIG. 1, these components are connected by a network 101, a network 102, a network 103, a network 104, or a network 105 in such a manner that they can communicate with each other. These five networks include, for example, a local area network (LAN), a wide area network (WAN), a telephone line, a dedicated digital line, an asynchronous transfer mode (ATM), a frame relay line, a cable television line, and a data broadcasting radio line. In the following description, it is assumed that the network 101 is the Internet, and the network 102, the network 103, the network 104, and the network 105 are the Internet, an intranet used in homes, companies, and the like, and a wireless LAN installed in a city.

The VR client terminal and the MR client terminal shown in FIG. 1 are, for example, dedicated hardware that corresponds to processing of drawing virtual content. Examples of such dedicated hardware include, for example, a head mounted display and a smart glass. Alternatively, the VR client terminal and the MR client terminal shown in FIG. 1 are mobile phones that have an environment in which the program can be executed. Examples of such a mobile phone include, for example, a smartphone.

The VR client terminal and the MR client terminal shown in FIG. 1 include a camera and a display: A camera is used to photograph the surroundings. A display is used to display virtual content. The VR client terminal and the MR client terminal shown in FIG. 1 generate an image by photographing the surroundings using a camera, display the image on a display, and project virtual content onto the image. As a result, the VR client terminal and the MR client terminal shown in FIG. 1 provide the user with a pseudo experience that combines a real space and a virtual space.

Note that, when the VR client terminal and the MR client terminal shown in FIG. 1 are not the dedicated hardware described above, they may use an application programming interface (API) provided by a web browser or operating system (OS) to draw virtual content.

The three VR client terminals shown in FIG. 1 include hardware and software corresponding to VR. On the other hand, the three MR client terminals shown in FIG. 1 include hardware and software corresponding to MR. Note that, the VR client terminal and the MR client terminal shown in FIG. 1 may include hardware and software corresponding to both VR and MR. The VR space management system 121 is realized by a server. Alternatively, the VR space management system 121 is realized by cloud computing.

Further, as shown in FIG. 1, the VR client terminal 131 is a head mounted display for VR. The VR client terminal 132 is a smartphone. The VR client terminal 133 is a personal computer. Similarly, as shown in FIG. 1, the MR client terminal 134 is a head mounted display for MR. The MR client terminal 135 is a smartphone. The MR client terminal 136 is a personal computer.

The VR space management system 121 provides virtual content in the VR space and positional information indicating a position of the virtual content to the VR client terminal 131, the VR client terminal 132, and the VR client terminal 133. In addition, the virtual content is, for example, digital content such as an avatar or a user interface that provides a specific function or service. The VR space management system 121 is realized by, for example, a server or cloud computing.

Additionally, the VR space management system 121 manages users who use the VR client terminal 131, users who use the VR client terminal 132, and users who use the VR client terminal 133. For example, the VR space management system 121 receives a request for logging in to the VR client terminal 131, the VR client terminal 132, or the VR client terminal 133, and executes processing of logging in to these three VR client terminals. Moreover, for example, the VR space management system 121 receives a request for logging out from the VR client terminal 131, the VR client terminal 132, or the VR client terminal 133, and executes processing of logging out from these three VR client terminals.

The MR space management system 122 provides a service for associating the feature amount of a real space acquired by a camera or the like with virtual content, a service for providing the virtual content to an external terminal, and the like. The MR space management system 122 is realized by, for example, a server or cloud computing.

The MR space management system 122 uses an anchor to associate the feature amount of a real space photographed by the camera with the virtual content. An anchor contains information used to associate the feature amount acquired from the real space with the virtual content. In addition, the anchor may include an identifier used to identify itself, a session ID, and the like, or may include property information including various parameters.

The MR space management system 122 receives a request for registering an anchor from the MR client terminal 134, the MR client terminal 135, or the MR client terminal 136, and manages the registered anchor. The MR space management system 122 also receives a request for acquiring an anchor from the MR client terminal 134, the MR client terminal 135, or the MR client terminal 136. Then, the MR space management system 122 returns an anchor that meets conditions among the managed anchors to the MR client terminal 134, the MR client terminal 135, or the MR client terminal 136.

Additionally, the MR space management system 122 manages users who use the MR client terminal 134, users who use the MR client terminal 135, and users who use the MR client terminal 136. For example, the MR space management system 121 receives a request for logging in to the MR client terminal 134, the MR client terminal 135, or the MR client terminal 136, and executes processing of logging in to these three MR client terminals. In addition, for example, the MR space management system 121 receives a request for logging out from the MR client terminal 134, the MR client terminal 135, or the MR client terminal 136, and executes processing of logging out from these three MR client terminals.

The function providing service 141 is a service of providing virtual content, which is a user interface, to a VR client terminal and an MR client terminal shown in FIG. 1. The function providing service 141 is realized by a server or cloud computing.

Note that, in the following description, a server may be realized by a single server or a single virtual server, or may be realized by a plurality of servers or a plurality of virtual servers. Moreover, in these cases, the plurality of virtual servers may be realized on a single server.

FIG. 2 is a diagram which shows an example of a configuration of hardware that realizes the VR space management system, the MR space management system, the function providing service, the VR client terminal, or the MR client terminal according to the embodiment. FIG. 2 includes a serial bus 201, a central processing unit (CPU) 202, a random access memory (RAM) 203, a read only memory (ROM) 204, a hard disk drive (HDD) 205, a display 206, a camera 207, an interface 208, a network interface card (NIC) 209, and a graphics processing unit (GPU) 210.

The serial bus 201 connects the CPU 202, the RAM 203, the ROM 204, the HDD 205, the display 206, the camera 207, the interface 208, the NIC 209, and the GPU 210 in a manner that allows them to communicate with each other.

The CPU 202 realizes functions of a system or a device and controls the entire system or device. For example, the CPU 202 executes an application program, an OS, and the like stored in the HDD 205. Moreover, for example, the CPU 202 temporarily stores information, files, and the like necessary for executing a program in the RAM 203.

The RAM 203 is a temporary storage means and functions as a main memory, a work area, or the like of the CPU 202 and the GPU 210. The ROM 204 is a storage means, and stores various types of data such as a basic I/O program. The HDD 205 is an external storage means, functions as a large-capacity memory; and stores an application program such as a web browser, a program of a service server group, an OS, a related program, and the like.

The display 206 is a display means and displays virtual content, information necessary for an operation, and the like. Moreover, the display 206, such as a touch panel, may have a function of receiving an operation from the user.

The camera 207 is an out-camera that takes images of the surroundings, and an in-camera that mainly takes images of the system or a user of the device.

The VR client terminal 131, the VR client terminal 132, and the VR client terminal 133 analyze a video photographed by an out-camera using the program stored in the HDD 205. Thereby, the VR client terminal 131, the VR client terminal 132, and the VR client terminal 133 can synchronize an operation of fingers of an avatar in a virtual space with an operation of fingers of the user.

The MR client terminal 134, the MR client terminal 135, and the MR client terminal 136 analyze the video photographed by the out-camera using the program stored in the HDD 205. As a result, the MR client terminal 134, the MR client terminal 135, and the MR client terminal 136 can be disposed by superimposing virtual content on a video in a real space displayed on the display 206, or can calculate a feature amount of the real space.

Moreover, as described above, the VR client terminal 131 and the MR client terminal 134 are head mounted displays, which are a type of terminal dedicated to XR. For this reason, the VR client terminal 131 and the MR client terminal 134 make it possible to operate the virtual content displayed on the display 206 with a finger of the user recognized by the camera 207.

Further, as described above, the VR client terminal 132 and the MR client terminal 135 are smartphones that are not dedicated terminals for XR. Therefore, the VR client terminal 132 and the MR client terminal 135 allow virtual content displayed on the display 206 to be operated using a touch panel or the like.

Note that, the VR space management system 121 and the MR space management system 122 do not necessarily require the camera 207.

The interface 208 is connected to peripheral devices such as an external storage device and a sensor. Moreover, a dedicated controller may be connected to the interface 208. When the dedicated controller is operated by the user, it allows the camera 207 to recognize a finger of the user, thereby operating virtual content in a virtual space and making contact with an avatar in the virtual space. The NIC 209 transmits and receives data to and from the outside via at least one of networks shown in FIG. 1. The GPU 210 executes processing necessary to draw virtual content in real time.

Note that, a hardware configuration shown in FIG. 2 is just an example. For example, data, a program, and the like are stored in the RAM 203, the ROM 204, the HDD 205, and the like according to these characteristics.

Figure 3:
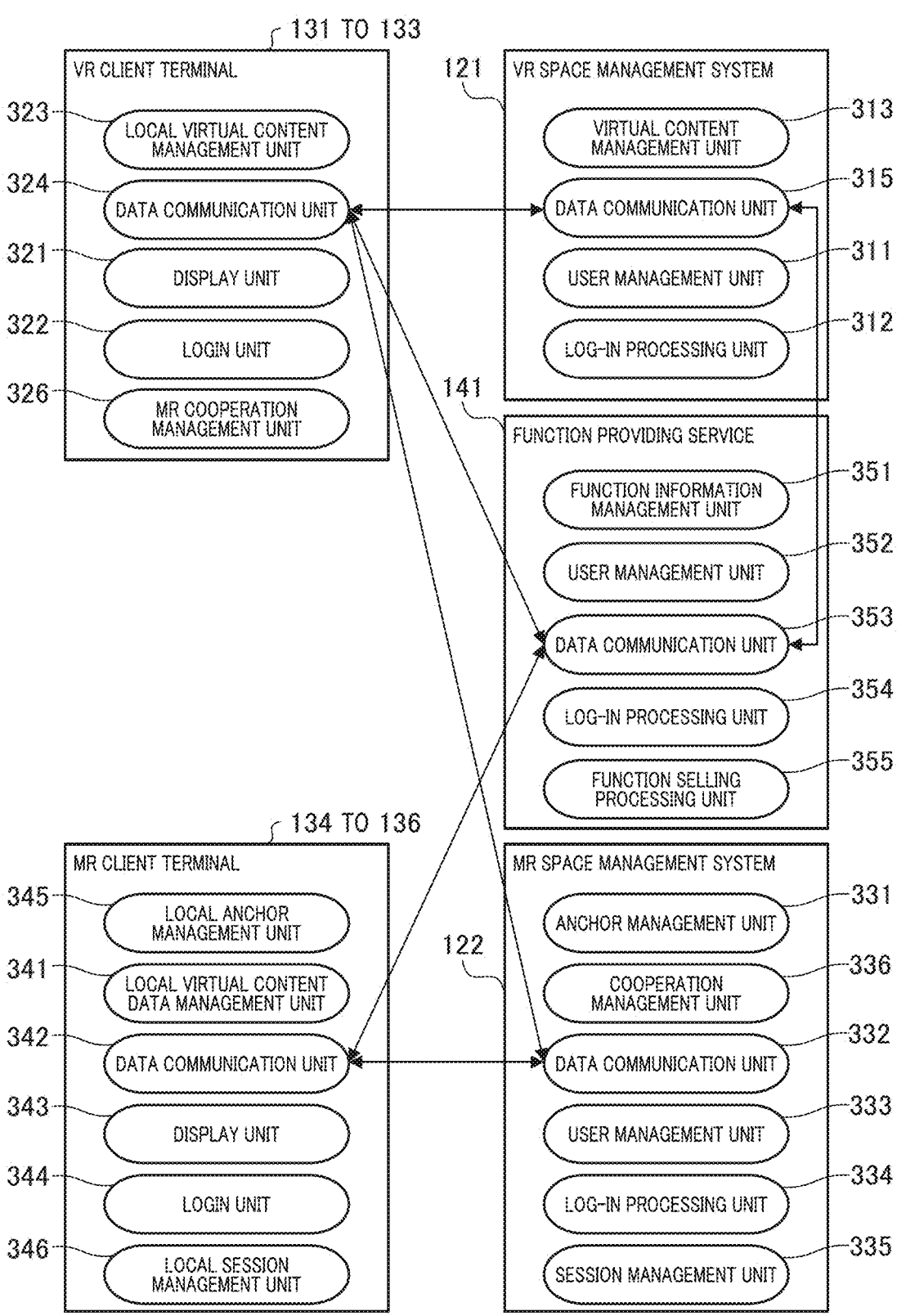
FIG. 3 is a diagram which shows an example of a software configuration of each of a VR space management system, an MR space management system, a function providing service, a VR client terminal, and an MR client terminal according to the embodiment.

Next, the VR space management system, the MR space management system, and the function providing service according to the embodiment will be described with reference to FIGS. 3 to 12. FIG. 3 is a diagram which shows an example of a software configuration of each of the VR space management system, the MR space management system, the function providing service, the VR client terminal, and the MR client terminal according to the embodiment. However, FIG. 3 shows the software configuration with excerpts of the functions related to the embodiment. Further, each configuration shown in FIG. 3 is realized by, for example, the CPU 202 or the GPU 210 executing a program stored in the HDD 205 or the like.

As shown in FIG. 3, the VR space management system 121 includes a user management unit 311, a log-in processing unit 312, a virtual content management unit 313, and a data communication unit 315.

The user management unit 311 manages user information, login information, and the like. The log-in processing unit 312 receives a log-in request from the VR client terminal 131, the VR client terminal 132, or the VR client terminal 133. Then, the log-in processing unit 312 collates with information of the user management unit 311 and returns results of log-in processing to the VR client terminal 131, the VR client terminal 132, or the VR client terminal 133.

Table 1 is an example of a user information management table of a VR user, which is managed by the user management unit 311. A user ID in Table 1 is an ID that uniquely identifies a user. A user name in Table 1 is a user name that can be freely set such as a nickname. A password in Table 1 is a basic authentication password used when a user ID logs in.

TABLE 1

| VR user information management table | | | | |
|---|---|---|---|---|
| User ID | User name | Password | Login state | Longin expiry date |
| User A | Taro | ******* | on | 2022/12/31 0:00:00 |
| User B | Jiro | ******* | on | 2022/12/31 0:00:00 |
| User C | Hanako | ******** | off | — |

The log-in processing unit 312 collates a combination of a user ID and a password included in log-in requests from the VR client terminal 131, the VR client terminal 132, and the VR client terminal 133 with Table 1. Then, when the combination of a user ID and a password matches description in any row of Table 1, the log-in processing unit 312 returns a result of the log-in to each VR client terminal as a success.

A log-in state in Table 1 indicates a log-in state of a user. Specifically, the log-in state in Table 1 is indicated as on. On the other hand, a logout state is indicated as off. A log-in expiration date indicates an expiration date of an authentication state of a user who has logged in.

The virtual content management unit 313 manages 3D data of virtual content such as an avatar disposed in the virtual space, and provides the VR client terminal 131, the VR client terminal 132, or the VR client terminal 133 with the managed 3D data via the data communication unit 315.

Table 2 is an example of a virtual content management table managed by the virtual content management unit 313. A virtual content ID is an ID that uniquely identifies virtual content in the VR space. 3D data is data of 3D models in various formats. Here, when the virtual content is an avatar of the user, in the present embodiment, the user ID in the VR user information management table shown in Table 1 is set as the virtual content ID. As another example, the virtual content management unit 313 manages the virtual content ID as an independent ID that is different from the user ID, and adds a virtual content ID column to a VR user information management table shown as Table 1 to manage it in association with the user ID. In addition, the virtual content management unit 313 may add a user ID column to the virtual content management table shown as Table 2 and manage it in association with the virtual content ID. Alternatively, the virtual content management unit 313 may prepare a table separate from the virtual content management table and manage the user ID column and the virtual content ID column in association with each other.

TABLE 2

| Virtual content management table | | |
|---|---|---|
| Virtual content ID | Virtual content data | Function data |
| User A | userA.obj | — |
| User B | userB.obj | — |
| User C | userC.obj | — |
| Object A | aaa.obj | — |
| Pet A1 | peta1.obj | peta1__func.json |
| Pet A2 | peta2.obj | Peta2__func.json |
| Pet A3 | peta3.0bj | Peta3__func.json |
| System A | system.obj | — |

Function data in Table 2 is function information on a function of providing virtual content as a user interface. The function data is acquired from the function providing service 141 by the local virtual content management unit 323 via the data communication unit 324. Details of the function data will be described below with reference to Table 7.

The virtual content management unit 313 realizes a basic function of providing a VR space. In addition, the virtual content management unit 313 manages positional information of virtual content such as avatar. Table 3 is an example of a virtual content positional information management table managed by the virtual content management unit 313.

TABLE 3

| Virtual content position information management table | | | | |
|---|---|---|---|---|
| Virtual content ID | Space ID | Main coordinates | Left hand coordinates | Right hand coordinates |
| User A | room A | (100, 100, 5) | (100, 98, 5) | (100, 102, 5) |
| User B | room A | (100, 104, 5) | (100, 102, 5) | (100, 106, 5) |
| User C | room B | (200, 206, 5) | (200, 202, 5) | (200, 206, 5) |
| Object A | room A | (99, 100, 5) | — | — |
| Pet A1 | room A | (1, 2, 3) | — | — |
| Pet A2 | room A | (6, 7, 10) | — | — |
| Pet A3 | room A | (11, 12, 15) | — | — |
| System A | room A | −9989991000 | — | — |

The virtual content ID is an ID that uniquely identifies virtual content. A space ID is an ID that uniquely identifies a VR space. Main coordinates are information that indicates a current position of virtual content. The current position of the virtual content here is, for example, a center of gravity of the virtual content. Left-hand coordinates are information indicating a position of the left hand of an avatar when the virtual content is the avatar. Right-hand coordinates are information indicating a position of the right hand of an avatar when the virtual content is the avatar.

The virtual content management unit 313 receives positional information from the VR client terminal 131, the VR client terminal 132, or the VR client terminal 133 when the position of the virtual content in the VR space has changed by these VR client terminals being operated. Alternatively, the virtual content management unit 313 periodically receives positional information from these VR client terminals. In addition, the virtual content management unit 313 also receives the positional information via the data communication unit 315. Moreover, the virtual content management unit 313 provides positional information of the virtual content and an avatar in the VR space to the VR client terminal 131, the VR client terminal 132, or the VR client terminal 133 via the data communication unit 315.

Next, software configurations of the VR client terminal 131, the VR client terminal 132, and the VR client terminal 133 will be described. As shown in FIG. 3, the VR client terminal 131, the VR client terminal 132, and the VR client terminal 133 include a display unit 321, a login unit 322, a local virtual content management unit 323, a data communication unit 324, and an MR cooperation management unit 326.

The display unit 321 displays the virtual content and the avatar in the VR space via the display 206. The login unit 322 transmits an image of the finger photographed by the camera 207, and a user name, a password, and the like input using an input device connected to the interface 208 to the log-in processing unit 334. Note that, an authentication method for the VR space management system 121 is face authentication using a face image photographed by the camera 207. Alternatively, the authentication method for the VR space management system 121 is iris authentication using an iris image photographed by the camera 207. Alternatively, the authentication method for the VR space management system 121 is fingerprint authentication using a fingerprint sensor connected to the interface 208.

The local virtual content management unit 323 manages information such as the 3D data of virtual content such as avatar acquired from the VR space management system 121 via the data communication unit 324. This management is executed on the VR client terminal 131, the VR client terminal 132, or the VR client terminal 133. Moreover, the local virtual content management unit 323 manages positional information of the virtual content in the VR space, which is shown in Table 3 and acquired from the VR space management system 121.

The local virtual content management unit 323 detects the position of virtual content such as an avatar that has changed due to an operation of the VR client terminal 131, the VR client terminal 132, or the VR client terminal 133. Then, the local virtual content management unit 323 stores positional information indicating the detected position in the local virtual content management unit 323.

Furthermore, the local virtual content management unit 323 transmits positional information of the virtual content to the virtual content management unit 313 when the position of the virtual content changes due to the operation of the VR client terminal 131, the VR client terminal 132, or the VR client terminal 133. Alternatively, the local virtual content management unit 323 periodically transmits positional information of the virtual content to the virtual content management unit 313. In addition, these transmissions are executed via the data communication unit 324. Moreover, the local virtual content management unit 323 periodically acquires the positional information of the virtual content from the virtual content management unit 313 via the data communication unit 324 and stores it.

The display unit 321 controls the display 206 to display changes such as movement of the virtual content in the VR space acquired from the VR space management system 121 in real time. According to an instruction from the user, the MR cooperation management unit 326 requests the MR space management system 122 to register an anchor corresponding to virtual content on the local virtual content management unit 323 specified by the user. At this time, the MR cooperation management unit 326 transmits the information shown in Table 2, such as 3D data of the specified virtual content, to the MR space management system 122 via the data communication unit 324.

The MR space management system 122 includes an anchor management unit 331, a data communication unit 332, a user management unit 333, a log-in processing unit 334, a session management unit 335, and a cooperation management unit 336.

The log-in processing unit 334 receives a log-in request from the MR client terminal 134, the MR client terminal 135, or the MR client terminal 136 via the data communication unit 332. Then, the log-in processing unit 334 returns a result of the log-in processing to the MR client terminal 134, the MR client terminal 135, or the MR client terminal 136 by collating with information of the user management unit 333. Here, if the log-in request includes a session ID, the log-in processing unit 334 includes the session ID in the result of the log-in processing. On the other hand, if the log-in request does not include a session ID, the log-in processing unit 334 generates a new session ID and includes it in the result of the log-in processing.

The session management unit 335 generates a new session ID. Table 4 is an example of the user information management table for an MR user managed by the user management unit 311. A user ID, a user name, a password, a login state, and a login expiration date shown in Table 4 are all the same as those shown in Table 1.

TABLE 4

| MR user information management table | | | | |
|---|---|---|---|---|
| User ID | User name | Password | Login state | Login expiry date |
| user A | Taro | ******** | on | 2022/12/1 0:00:00 |
| user B | Jiro | ******** | off | — |
| user D | Saburo | ********* | on | 2022/11/28 0:00:00 |

If the data communication unit 332 receives the request for registering an anchor from the MR client terminal 134, the MR client terminal 135, or the MR client terminal 136, it stores the received anchor information using the anchor management unit 331. The data communication unit 332 also receives a request for acquiring an anchor from the MR client terminal 134, the MR client terminal 135, or the MR client terminal 136. When the anchor management unit 331 has received a request for acquiring an anchor, it searches for an anchor that meets conditions and returns it to the MR client terminal 134, the MR client terminal 135, or the MR client terminal 136.

Table 5 shows an example of anchor information managed by the anchor management unit 331. The data communication unit 332 receives the request for registering an anchor or a request for updating an anchor from the MR client terminal 134, the MR client terminal 135, or the MR client terminal 136. In such a case, the anchor management unit 331 stores a record of the received anchor.

TABLE 5

Anchor information

| Anchor ID | Session ID | Virtual content data | Function data | Feature amount | Virtual content positional information | Sensor information | Owner | Temporary anchor | Registration date and time | Update date and time |
|---|---|---|---|---|---|---|---|---|---|---|
| anchor 001 | Session 001 | object1.obj | | feature1.dat | (1, 23, 31) | Beacon: 123 | UserA | — | 2022/10/19 8:00:00 | 2022/11/28 15:00:00 |
| anchor 002 | Session 001 | object2.obj | | feature2.dat | (1, 3, 22) | Beacon: 123 | UserB | — | 2022/10/20 9:00:00 | 2022/10/20 10:00:00 |
| anchor 003 | Session 002 | object3.obj | | feature3.dat | (25, 3, 41) | Wifi: 345 | UserD | — | 2022/10/23 7:00:00 | 2022/11/1 9:00:00 |
| anchor 004 | | peta1.obj | peta1__func.json | qrcode.dat | (0, 0, 0) | | UserA | ○ | 2022/10/25 11:00:00 | 2022/10/28 7:00:00 |
| anchor 005 | | peta2.obj | peta2__func.json | feature1.dat | (0, 0, 0) | | UserA | — | 2022/11/3 8:00:00 | 2022/11/15 15:00:00 |
| anchor 006 | | peta3.obj | peta3__func.json | — | (0, 0, 0) | | UserA | — | 2022/15/5 4:00:00 | 2022/11/6 8:00:00 |

An anchor ID is a unique ID that identifies an anchor, and is assigned when the anchor management unit 331 receives the request for registering an anchor and stores a record of anchor information shown in Table 5. If sessions are the same, the same ID is added for a session ID. By associating a plurality of anchors with one session ID, the system can simultaneously present the plurality of anchors with the same session ID to the user. Virtual content data is 3D model data in any format.

The feature amount is a three-dimensional feature amount of the real space obtained by analyzing data obtained by the camera 207 photographing the periphery where an anchor is disposed. The feature amount also includes reference point information that is used as a reference point for anchor disposition among feature amounts. For example, it is assumed that the reference point is a three-dimensional average position (middle position) of all the feature points included in the feature amount of anchor.

Virtual content positional information represents a three-dimensional position of virtual content in the real space. In addition, virtual content positional information indicates this position in relative coordinates from the reference point described above. A sensor information column includes information such as GPS coordinates indicating a place where an anchor is disposed, a Beacon with which an anchor is associated, a Wifi ID, and the like.

The anchor management unit 331 can return one anchor associated with a specific anchor ID in response to the request for acquiring an anchor from the MR client terminal 134, the MR client terminal 135, or the MR client terminal 136 via the data communication unit 332. Moreover, the anchor management unit 331 can also return a plurality of anchors associated with the same session ID or the same sensor ID. An owner column is a user ID of a user who has created an anchor, and stores any of values of the user ID column in Table 4.

A temporary anchor indicates whether the reference point information for anchor disposition stored in the feature amount column is temporary information. "o" displayed in the column indicating a temporary anchor indicates that it is temporary information, and a corresponding anchor is called a temporary anchor. For example, the anchor management unit 331 temporarily disposes virtual content on the MR client terminal 134, the MR client terminal 135, or the MR client terminal 136 using a two-dimensional barcode as reference point information, and then updates the reference point information such as the feature amount column based on a feature amount of the surrounding other than the two-dimensional barcode. Here, an anchor for which the feature amount of a temporary anchor has been updated and "o" has been deleted from the temporary anchor column is referred to as a main anchor.

The cooperation management unit 336 receives the request for registering an anchor corresponding to virtual content managed by the local virtual content management unit 323 from the VR client terminal 131, the VR client terminal 132, or the VR client terminal 133 via the data communication unit 332. If the request for registering an anchor is received, the cooperation management unit 336 registers an anchor in the anchor information shown in Table 5 via the anchor management unit 331 based on information on the virtual content included in the received request for registering an anchor.

Here, the cooperation management unit 336 may generate a feature amount to be stored in the feature amount column of the anchor information shown in Table 5 when an anchor is registered. For example, the cooperation management unit 336 generates a two-dimensional barcode, stores it in the feature amount column, and associates a feature amount of this two-dimensional barcode with the received virtual content to newly register an anchor. At this time, the cooperation management unit 336 stores "o" in the temporary anchor column of the anchor information shown in Table 5, and sets the newly registered anchor as a temporary anchor. An example of the anchor registered by this anchor registration means is an anchor with an anchor ID "anchor004" in Table 5, and the feature amount of the two-dimensional barcode is a feature amount "arcode.dat."

The two-dimensional barcode described above is included in a response to the VR client terminal 131, the VR client terminal 132, or the VR client terminal 133 that has made the request of registering an anchor. The VR client terminal 131, the VR client terminal 132, or the VR client terminal 133 stores this two-dimensional barcode in the MR cooperation management unit 326. The MR cooperation management unit 326 of the VR client terminal 131 can instruct a printer (not shown) to print a two-dimensional barcode. When the MR client terminal 134, the MR client terminal 135, and the MR client terminal 136 detect a feature amount of the printed two-dimensional barcode, they dispose and display virtual content associated with the two-dimensional barcode when the temporary anchor described above from the MR space management system 122 is acquired.

Furthermore, at this time, the MR client terminal 134, the MR client terminal 135, or the MR client terminal 136 updates information of the feature amount column of the temporary anchor described above with a feature amount of the real space other than the two-dimensional barcode acquired by the MR client terminal 134, the MR client terminal 135, or the MR client terminal 136. Then, the MR client terminal 134, the MR client terminal 135, or the MR client terminal 136 deletes "o" from the temporary anchor column and sets it as a main anchor.

In addition, as another means of registering an anchor, a new anchor may also be registered by using the feature amount of the registered anchor in the anchor information shown in Table 5, and associating the feature amount of the registered anchor with the received virtual content. An example of an anchor registered by this anchor registration means is an anchor with an anchor ID "anchor005" in Table 5. Then, using a feature amount "feature1.dat" of the registered anchor ID "anchor001," the anchor ID "anchor005" is newly registered.

Furthermore, as another means of registering an anchor, a new anchor may also be registered by leaving the feature amount column of the anchor information shown in Table 5 unstored (indefinite) and storing the received virtual content in the virtual content data column. In this case, when the MR client terminal 134, the MR client terminal 135, and the MR client terminal 136 acquire a newly registered anchor (with indefinite features) from the MR space management system 122, they execute the following processing. In such a case, the MR client terminal 134, the MR client terminal 135, and the MR client terminal 136 store the feature amount in the real space acquired by the MR client terminal 134, the MR client terminal 135, or the MR client terminal 136 in the feature amount column.

An example of an anchor registered by this means is an anchor with an anchor ID "anchor006" in Table 5, and the feature amount is not stored (indefinite). A registration date and time column of the anchor information shown in Table 5 is a date and time when an anchor is registered. Moreover, an update date and time column of the anchor information shown in Table 5 is a date and time when an anchor is updated. When an anchor is registered, the date and time information stored in the registration date and time column and the date and time information stored in the update date and time column are the same, and after that, when the anchor is updated, only the date and time information in the update date and time column is updated. A function data column indicates function information of a function of providing virtual content as a user interface, and is acquired by the local anchor management unit 345 from the function providing service 141 via the data communication unit 342. Details of the function data will be described below with reference to Table 7.

The MR client terminal 134, the MR client terminal 135, and the MR client terminal 136 include a local virtual content data management unit 341, a data communication unit 342, a display unit 343, a login unit 344, a local anchor management unit 345, and a local session management unit 346.

The display unit 343 displays virtual content in the MR space via the display 206. If a user inputs a user name and a password to request a login, the login unit 344 transmits a login request to the MR space management system 122 via the data communication unit 342. At this time, the user name and the password are input using a finger photographed by the camera 207, an operation on a touch panel which is an example of the display 206, a keyboard connected to the interface 208, or the like.

Additionally, the login unit 344 presents the user with a list of existing session IDs stored by the local session management unit 346 on a login screen not shown. Then, the login unit 344 transmits a request for the user to log in after selecting a session ID to the MR space management system 122, and if the login is successful, the user enters a session with the session ID. The login unit 344 also transmits a request for the user to log in with no session ID selected to the MR space management system 122, and if the login is successful, a session is started with a new session ID.

Examples of an authentication method for the MR space management system 122 at a time of login include face authentication using an image of a face photographed by the camera 207, iris authentication using an iris photographed by the camera 207, fingerprint authentication using a fingerprint sensor connected to the interface 208, and the like.

In addition, the local virtual content data management unit 341 stores data of 3D models in various formats when a session ID stored in the local session management unit 346 is specified by a user. The 3D data stored by the local virtual content data management unit 341 is virtual content that the user can freely dispose over the real space.

The local anchor management unit 345 executes processing of creating an anchor according to the operation of a user. First, the user selects virtual content such as a 3D model stored in the local virtual content data management unit 341 through the local anchor management unit 345. Then, the local anchor management unit 345 disposes virtual content in the real space in response to a finger photographed by the camera 207, an operation on a touch panel, which is an example of the display 206, and the like. When an anchor is created through such processing, the local anchor management unit 345 associates a session ID of a session in which the user is currently logged in with an anchor.

If an anchor is created, the local anchor management unit 345 transmits the request for registering the anchor to the MR space management system 122 via the data communication unit 342. In addition, the local anchor management unit 345 can transmit the request for acquiring the anchor to the MR space management system 122 via the data communication unit 342, and acquire the anchor in Table 1 held by the anchor management unit 331. The request for acquiring the anchor can be made by specifying a specific anchor ID, or by specifying the session ID of a session in which a user is currently logged in. Then, if there is an anchor whose feature amount in the real space match the acquired anchor, the local anchor management unit 345 disposes virtual content included in the anchor based on the virtual content positional information shown in Table 5.

At this time, when the anchor is a temporary anchor, that is, if "O" is displayed in the temporary anchor column of Table 5, the local anchor management unit 345 updates a feature amount currently set for the temporary anchor using the feature amount in the real space other than the feature amount currently set. For example, the local anchor management unit 345 executes the following processing when the feature amount set for the temporary anchor is the feature amount of a two-dimensional barcode. In such a case, the local anchor management unit 345 uses feature amounts detected from the real space other than the feature amount of the two-dimensional barcode to update the anchor information of the anchor, that is, the feature amount of the anchor information shown in Table 5. Then, the local anchor management unit 345 deletes "o" from the temporary anchor column of the anchor information and sets it as the main anchor. If the local anchor management unit 345 updates the anchor information shown in Table 5, it transmits the request for updating an anchor to the MR space management system 122 via the data communication unit 342.

The function providing service 141 uses virtual content such as virtual pet content in the VR space and the MR space as a user interface, and provides its own functions such as a virtual pet function. As shown in FIG. 3, the function providing service 141 includes a function information management unit 351, a user management unit 352, a data communication unit 353, and a log-in processing unit 354.

The log-in processing unit 354 receives a log-in request from the VR client terminal 131, the VR client terminal 132, the VR client terminal 133, the MR client terminal 134, the MR client terminal 135, or the MR client terminal 136. The log-in processing unit 354 receives this request via the data communication unit 353. Then, the log-in processing unit 354 returns a result of the log-in processing to these terminals by collating with information of the user management unit 352.

Table 6 is an example of function providing service user information of a user who uses the function providing service, which is managed by the user management unit 352. A user ID, a user name, a password, a login state, and a login expiration date shown in Table 6 are all the same as in Table 1.

TABLE 6

| Function providing service user information expiry | | | | |
|---|---|---|---|---|
| User ID | User name | Password | Login state | Login expiry date |
| userA | Taro | ********* | On | 2022/12/31 0:00:00 |

The data communication unit 353 receives a request for acquiring function information from the VR client terminal 131, the VR client terminal 132, the VR client terminal 133, the MR client terminal 134, the MR client terminal 135, or the MR client terminal 136. In this case, the function information management unit 351 searches for function information that meets conditions. The data communication unit 353 then returns this function information to the VR client terminal 131, the VR client terminal 132, the VR client terminal 133, the MR client terminal 134, the MR client terminal 135, or the MR client terminal 136. Table 7 is an example of a function information management table managed by the function information management unit 351.

TABLE 7

| Function information management table | | | | |
|---|---|---|---|---|
| Virtual content ID | Virtual content data | Function ID | Function data | Owner |
| Pet A1 | peta1.obj | dog 1 | peta1.func.json | user A |
| Pet A2 | peta2.obj | dog 1 | peta2.func.json | user A |
| Pet A3 | peta3.obj | dog 2 | peta3.func.json | user A |

The data communication unit 353 receives the request of acquiring function information from the VR client terminal 131, the VR client terminal 132, the VR client terminal 133, the MR client terminal 134, the MR client terminal 135, or the MR client terminal 136. The data communication unit

353 then returns one piece of function information associated with a specific virtual content ID to these terminals.

An owner in Table 7 is a user ID of a user who owns virtual content, and any of the values in the user ID column of Table 6 is stored. This virtual content is provided in association with a purchased function when the user purchases a function from a function selling processing unit 355 of the function providing service 141.

The function selling processing unit 355 receives a request for purchasing a function, such as a request for purchasing a virtual pet function, from the VR client terminal 131, the VR client terminal 132, or the VR client terminal 133. In this case, the function selling processing unit 355 generates function information based on a function ID of a function specified by a user at a time of purchase. The function selling processing unit 355 then stores a record in the function information management table shown in Table 7 via the function information management unit 351. Note that, function information will be described below.

A user ID of a user who has purchased a function is stored in an owner column of the record. A virtual content ID is a unique ID that identifies virtual content. Virtual content data stores information on a 3D shape such as a virtual pet generated by processing of generating function information. In addition, function data is generated by the processing of generating function information, and stores information regarding settings, a state, a history, and the like for realizing provided functions such as a virtual pet running around and growing.

Table 8 is a function master management table managed by the function information management unit 351 related to the processing of generating function information described above.

TABLE 8

| Function master management table | | | |
|---|---|---|---|
| Function ID | Initial virtual content data | Initial function data | Provided function map |
| dog 1 | def_dog1.obj | def_dog1_func.json | func_dog1_map.json |
| dog 2 | def_dog2.obj | def_dog2_func.json | func_dog2_map.json |
| cat 1 | def_cat1.obj | def_cat1_func.json | func_cat1_map.json |

When the function selling processing unit 355 receives a request for purchasing a function, it acquires a record corresponding to a function ID from the function master management table shown in Table 8 via the function information management unit 351. Note that, a corresponding record will hereinafter be referred to as function master information. The function selling processing unit 355 extracts a value of an initial virtual object data column and a value of an initial function data column of this function master information. Then, the function selling processing unit 355 executes the following processing for a purpose of registering virtual content as a value of the virtual content data column and a value of the function data column, respectively. For this purpose, the function selling processing unit 355 transmits a request for registering the virtual content to the virtual content management unit 313 of the VR space management system 121 via the data communication unit 353.

When the virtual content management unit 313 receives the request for registering the virtual content, it issues a new virtual content ID, registers a record in the virtual content management table shown in Table 2, and responds to the function selling processing unit 355 regarding the registered virtual content. When the function selling processing unit 355 receives the response, it performs processing of generating function information by adding a virtual content ID, virtual content data, and function data information of virtual content in Table 2, which are transmitted to the owner. This owner is an owner who has received the virtual content, and is an owner who has a function ID at a time of receiving the request for purchasing a function. The function selling processing unit 355 registers function information in the function information management table shown in Table 7 via the function information management unit 351. Then, the function selling processing unit 355 responds by including function information registered in a response to a request of purchasing a function received from the VR client terminal 131, the VR client terminal 132, or the VR client terminal 133.

A provided function map in Table 8 is information such as a condition map that updates virtual content data and function data in light of information included in function data of the function information shown in Table 7. For example, by taking a virtual pet as an example, the function selling processing unit 355 defines conditions such as gradually changing a 3D shape from a puppy to an adult dog according to the predetermined number of elapsed days based on a monthly usage of the virtual pet indicated by state information, which is the number of elapsed days since a purchase, as the provided function map. Then, the function selling processing unit 355 updates the virtual content data shown in Table 7 according to the defined conditions. As another example, the function selling processing unit 355 defines conditions such as changing an operation pattern of the virtual pet when the user clears one or more predetermined actions for the virtual pet as the provided function map, and updates setting information regarding the operation pattern of the function data shown in Table 7 according to the conditions.

Figure 5:
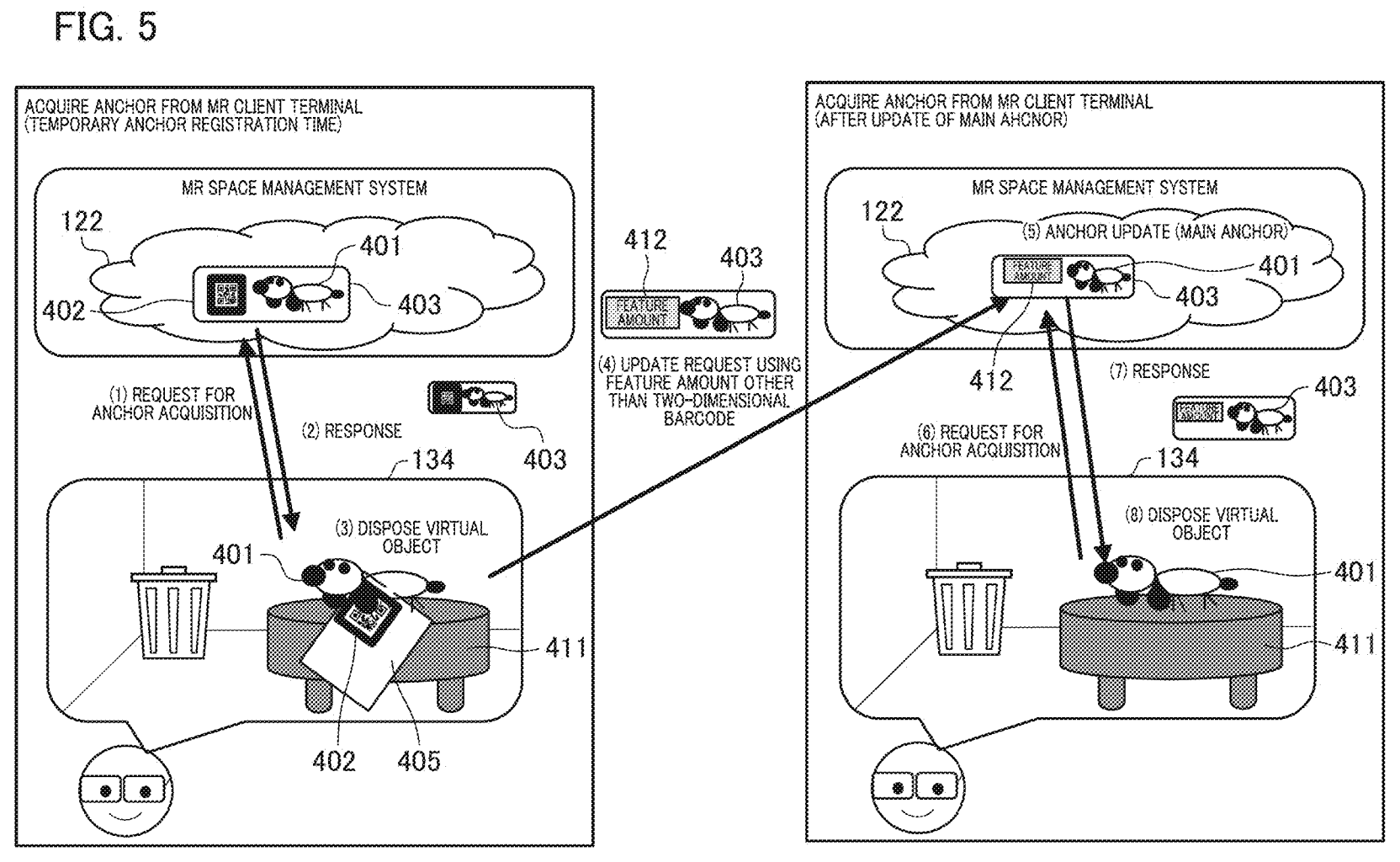

FIGS. 4 and 5 are diagrams for describing an example of processing in which a registration of an anchor from a VR client terminal to the MR space management system is requested, and the MR client terminal acquires the anchor in the embodiment. Specifically, FIGS. 4 and 5 are diagrams for describing a flow when the VR client terminal 131 in a VR space shares virtual content 401 in the VR space with the MR client terminal 134 via the MR space management system 122. The virtual content 401 is, for example, a virtual pet.

More specifically; FIG. 4 is a diagram for describing a scene in which a head mounted display type VR client terminal 131 requests the MR space management system 122 to register an anchor corresponding to the virtual content 401 in the VR space. The VR client terminal 131 transmits information on the virtual content 401 to the MR space management system 122 when anchor registration is requested. In addition, in the present embodiment, if the request for registering an anchor is received, the MR space management system 122 generates a two-dimensional barcode 402 that is a feature amount of the anchor, and registers an anchor 403 as a temporary anchor.

The MR space management system 122 then responds to the VR client terminal 131 by including the two-dimensional barcode 402 in response information to the request for registering an anchor. If the VR client terminal 131 receives a response, it stores the two-dimensional barcode in the response. When the printer 404 specifies the two-dimensional barcode stored by the VR client terminal 131 and instructs the printer 404 to print it, the printer 404 outputs paper 405 on which the two-dimensional barcode is printed.

More specifically: FIG. 5 is a diagram for describing a flow when the MR space management system 122 is requested to acquire the anchor 403 on the MR space management system 122 registered in FIG. 4 by the head mounted display type MR client terminal 134. The MR space management system 122 responds to the anchor 403 if the request for acquiring an anchor is received from the MR client terminal 134. When the MR client terminal 134 has received the response, it places the paper 405 on which the two-dimensional barcode is printed on a desk 411 to dispose and display the virtual content 401 included in the anchor 403 that is responded to. At this time, the MR client terminal 134 detects that the two-dimensional barcode 402 on the paper 405 in the real space matches the feature amount 402 included in the anchor 403, and disposes the virtual content 401.

Moreover, in the present embodiment, when the MR client terminal 134 confirms that the received anchor 403 is a temporary anchor, that is, when it confirms that the temporary anchor column in Table 5 is "o" the MR client terminal 134 changes the feature amount of anchor 403 to a feature amount other than the two-dimensional barcode 402. At this time, the MR client terminal 134 changes the anchor 403 to the main anchor. That is, the MR client terminal 134 deletes "o" in the temporary anchor column of Table 5. Here, the feature amount other than the two-dimensional barcode 402 mentioned above is, for example, a feature amount 412 representing the physical feature point of the desk 411. The physical feature points of the desk 411 are, for example, feature points on the edge of the desk.

When the MR client terminal 134 changes an anchor, it transmits a request for updating the anchor to the MR space management system 122. Then, if the request for updating the anchor is received, the MR space management system 122 updates the registered anchor 403. Here, the MR client terminal 134 updates the two-dimensional barcode 402, which is the feature amount in the anchor 403 before the update, with the feature amount 412 after the update. In addition, the MR client terminal 134 deletes "o" in the temporary anchor column of Table 5, which is not shown.

Subsequently, when the MR client terminal 134 requests the MR client terminal 134 again to acquire an anchor, the MR space management system 122 responds with the updated anchor 403. After the response is received, the MR client terminal 134 detects that the feature amount 412 included in the responded anchor 403 matches the feature amount of the real space, and displays the virtual content 401 by disposing it. In the present embodiment, the MR client terminal 134 detects a physical feature point of the desk 411 as described above as the feature amount of the real space. This physical feature point of the desk 411 is, for example, a feature point on an edge of the desk.

Figure 6:
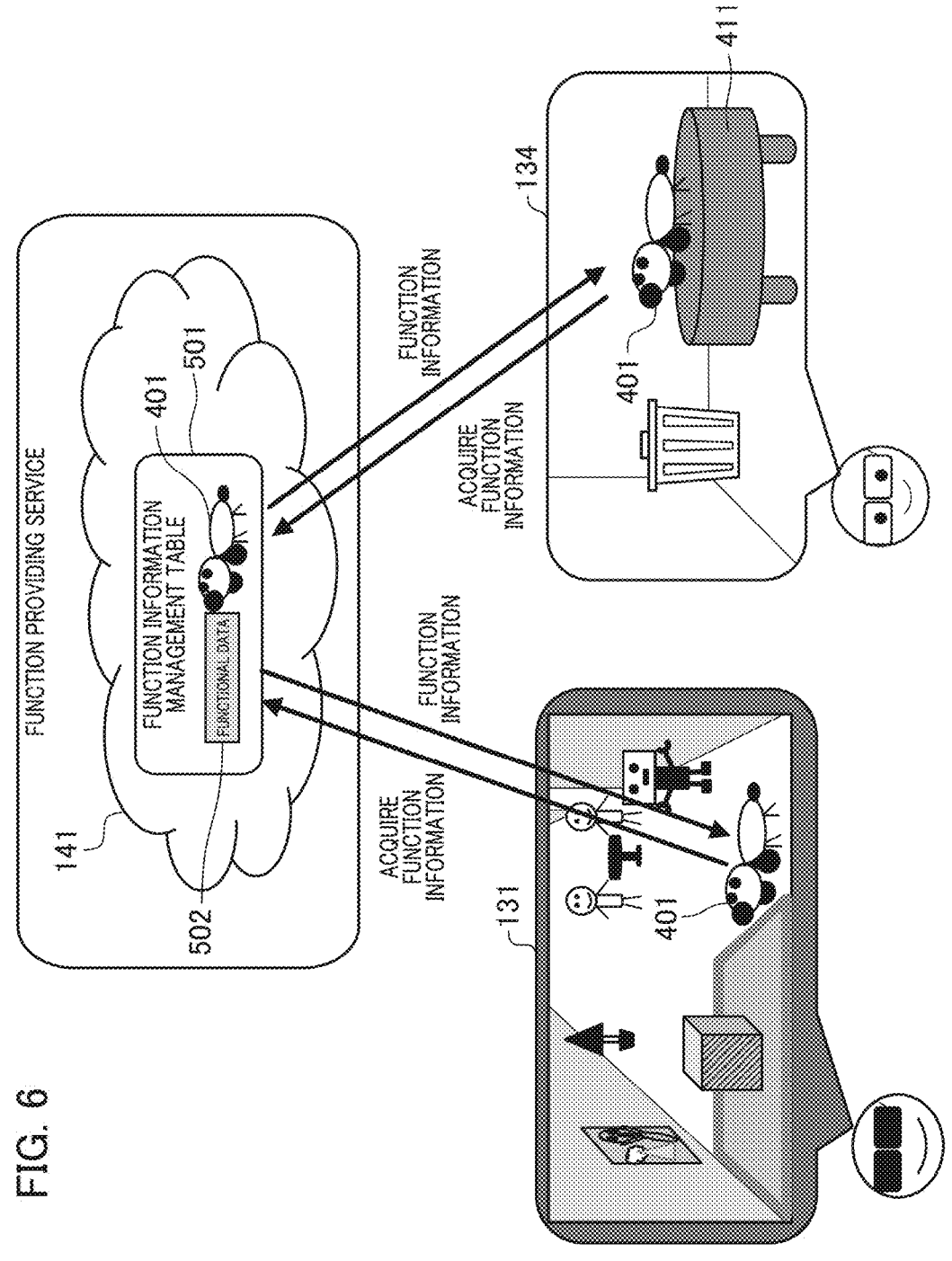
FIG. 6 is a diagram for describing an example of processing in which the VR client terminal and the MR client terminal acquire function information from the function providing service via virtual content in the embodiment.

FIG. 6 is a diagram for describing an example of processing in which the VR client terminal and the MR client terminal acquire function information from the function providing service via virtual content in the embodiment. Specifically. FIG. 6 is for describing processing in which each of the head mounted display type VR client terminal 131 and MR client terminal 134 acquires function information 501 from the function providing service 141 via the virtual content 401.

The VR client terminal 131 and the MR client terminal 134 each transmit a request for acquiring function information by including the virtual content ID shown in Table 7 in the request to the function providing service 141. Then, the function providing service 141 responds with the function information 501 corresponding to a corresponding virtual content.

The VR client terminal 131 and the MR client terminal 134 are used for 3D data such as the appearance of the virtual pet based on the virtual content 401 of the function information 501 that has been responded with. The virtual content 401 is an example of virtual content data in Table 7. Moreover, the VR client terminal 131 and the MR client terminal 134 are used for an operation of the virtual content 401 based on the function data 502 of the function information 501. The function data 502 is, for example, function data in Table 7. In addition, the operation of the virtual content 401 is, for example, how the virtual pet moves and how it reacts when it comes into contact with the avatar of the user.

Next, referring to FIGS. 7 to 12, a series of flows when sharing virtual content in a VR space, sharing virtual content in an MR space, and sharing virtual content from the VR space to the MR space are executed will be described.

Figure 7:
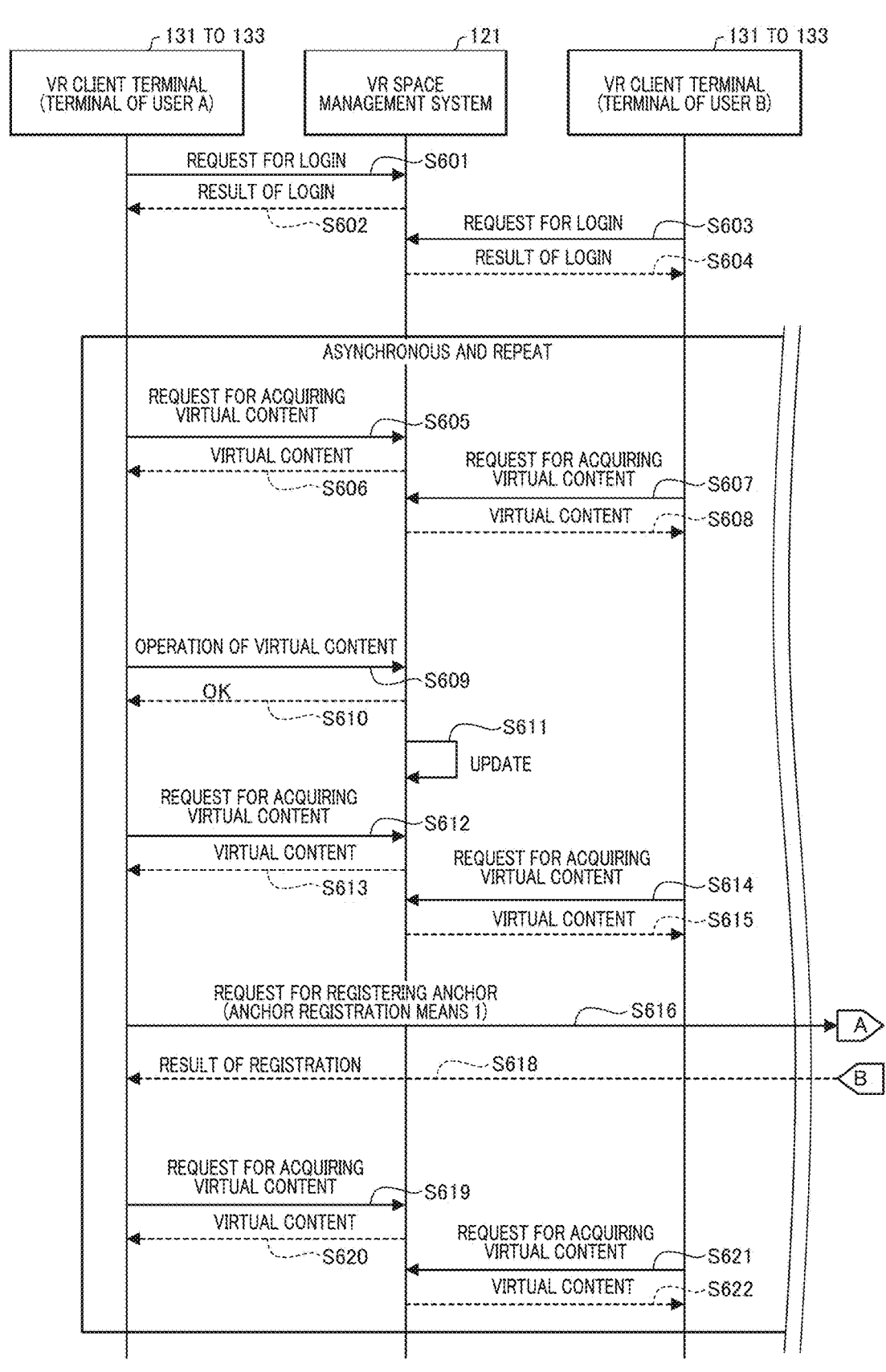
FIG. 7 is a sequence diagram which shows an example of processing for sharing virtual content between the VR client terminal and the MR client terminal according to the embodiment.
Figure 8:
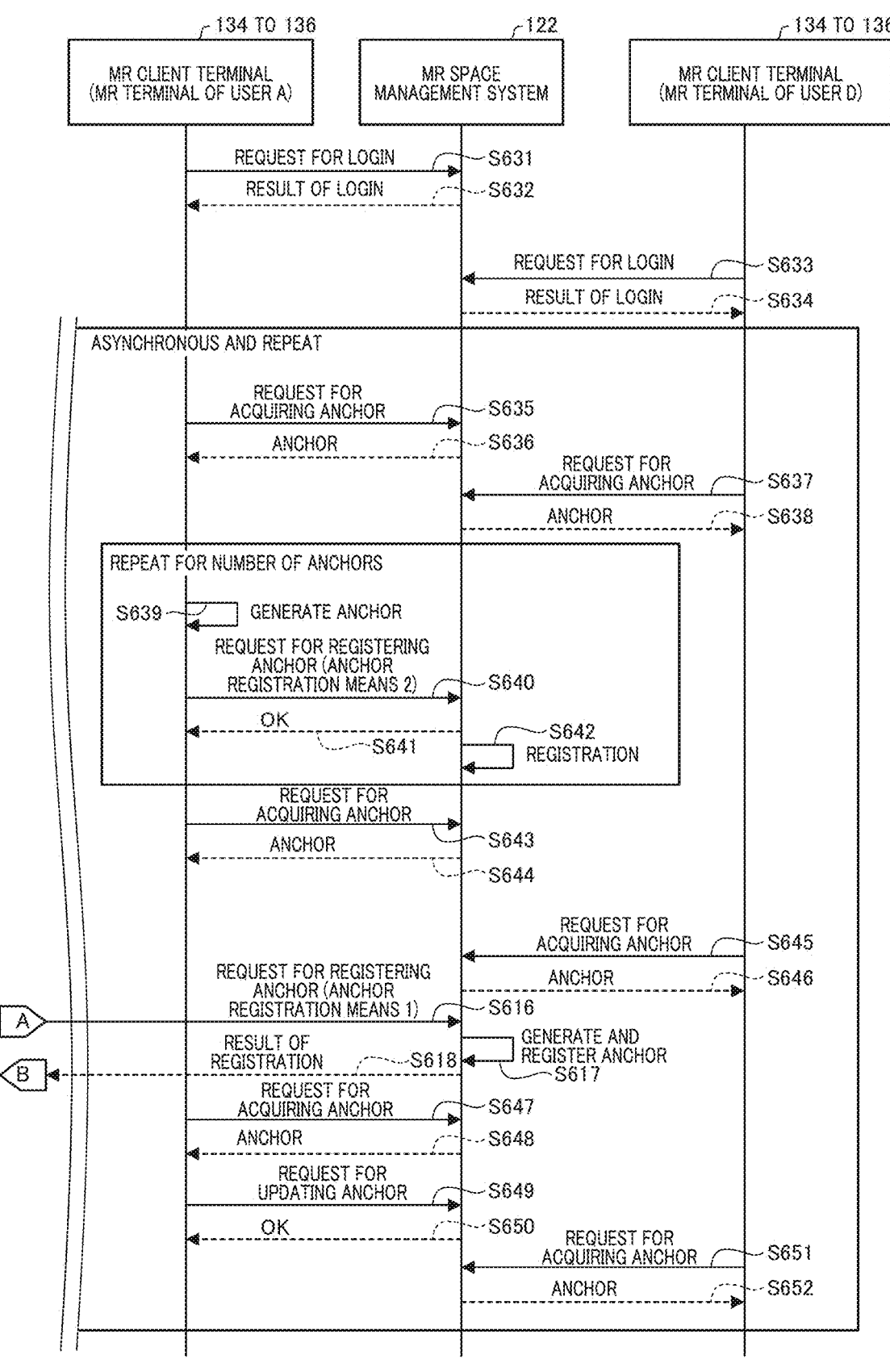
FIG. 8 is a sequence diagram which shows an example of processing for sharing virtual content between the VR client terminal and the MR client terminal according to the embodiment.

First, an entire processing sequence will be described with reference to FIGS. 7 and 8. FIGS. 7 and 8 are sequence diagrams which show an example of processing of sharing virtual content between a VR client terminal and an MR client terminal according to the embodiment. Moreover, FIG. 7 and FIG. 8 are connected by a connector A and a connector B.

In step S601, the login unit 322 of the VR client terminals 131 to 133 of the user A transmits a user ID and a password to the log-in processing unit 312.

In step S602, the log-in processing unit 312 refers to the VR user information management table in Table 1 managed by the user management unit 311, confirms that the user ID and the password match the user A, and if they match, returns a result of the log-in as a successful log-in.

Similarly, in step S603, the login unit 322 of the client terminals 131 to 133 of the user B transmits the user ID and the password to the log-in processing unit 312.

In step S604, the log-in processing unit 312 refers to the VR user information management table in Table 1 managed by the user management unit 311, and confirms that the user ID and the password match the user B. Then, if the user ID and the password match the user B, the log-in processing unit 312 returns a result of the log-in indicating that the log-in is successful.

Thereafter, from step S605 to step S622, it is assumed that steps related to acquiring and updating virtual content are executed, and are executed periodically and asynchronously with other steps.

In step S605, the local virtual content management unit 323 of the VR client terminals 131 to 133 transmits a request for acquiring virtual content to the virtual content management unit 313.

In step S606, the VR space management system 121 acquires the virtual content. The virtual content acquired in step S606 is virtual content of the virtual content management table in Table 2 managed by the virtual content management unit 323.

Similarly, in step S607, the local virtual content management unit 323 of the VR client terminals 131 to 133 transmits a request for acquiring virtual content to the virtual content management unit 313.

In step S608, the VR space management system 121 acquires the virtual content.

In step S609, the user A operates and updates the virtual content from the client terminals 131 to 133. At this time, the local virtual content management unit 323 acquires positional information of the virtual content of the user A based on the operation, and transmits the positional information to the virtual content management unit 313. In addition, at this time, the local virtual content management unit 323 requests an update of the virtual content.

In step S610, the virtual content management unit 313 returns a notification that the reception has been completed to the local virtual content management unit 323.

In step S611, the virtual content management unit 313 updates the positional information of the user A shown in Table 2 as a result of this update request of the virtual content.

In step S612, the local virtual content management unit 323 of the VR client terminals 131 to 133 of the user A transmits a request for acquiring virtual content to the virtual content management unit 313.

In step SS613, the virtual content management unit 313 returns the virtual content to the local virtual content management unit 323.

In step S614, the local virtual content management unit 323 of the VR client terminals 131 to 133 of the user B transmits a request for acquiring virtual content to the virtual content management unit 313.

In step S615, the virtual content management unit 313 returns the virtual content to the local virtual content management unit 323.

Steps S616 to S618 will be described below.

In steps S619 to S622, the same operations as those in steps S612 to S615 are performed, respectively. In the present embodiment, it is assumed that the user A and the user B log in using the VR client terminal 131 or the like according to steps S601 to S604. Then, in the present embodiment, it is assumed that the user A and the user B make requests for acquiring virtual content periodically from step S605 to step S608, from step S619 to step S622, and from step S612 to step S615. Note that, as another example, a request for randomly acquiring virtual content may also be made.

In step S631, the login unit 344 of the MR client terminal 134, the MR client terminal 135, and the MR client terminal 136 of the user A transmits a user ID and a password to the log-in processing unit 334.

In step S632, the log-in processing unit 334 refers to an MR user information management table in Table 4 managed by the user management unit 333, and confirms that the user ID and the password match the user A. Then, if the user ID and the password match the user A, the log-in processing unit 334 returns a log-in result indicating that the log-in has been successful.

In step S633, the login unit 344 of the MR client terminal 134, the MR client terminal 135, or the MR client terminal 136 of the user B transmits a user ID and a password to the log-in processing unit 334.

In step S634, the log-in processing unit 334 refers to the MR user information management table in Table 4 managed by the user management unit 333, confirms that the user ID and the password match the user B, and if they match, returns a log-in result as a successful log-in.

Thereafter, it is assumed that processing related to anchor acquisition and anchor registration are executed in steps SS635 to S652. In addition, it is assumed that this processing is not synchronized with other steps and is executed periodically.

In step S635, the local anchor management unit 345 of the MR client terminal 134, the MR client terminal 135, or the MR client terminal 136 transmits a request for acquiring an anchor to the anchor management unit 331.

In step S636, the local anchor management unit 345 of the MR client terminal 134, the MR client terminal 135, or the MR client terminal 136 acquires an anchor. The anchor acquired in S636 is an anchor of the anchor information in Table 5 managed by the anchor management unit 331.

In step S637, the local anchor management unit 345 of the MR client terminal 134, the MR client terminal 135, or the MR client terminal 136 transmits a request for acquiring an anchor to the anchor management unit 331.

In step S638, the local anchor management unit 345 of the MR client terminal 134, the MR client terminal 135, or the MR client terminal 136 acquires an anchor.

In step S639, the local anchor management unit 345 of the MR client terminal 134, the MR client terminal 135, or the MR client terminal 136 selects virtual content stored in the local virtual content data management unit 341 and places it in the real space. Moreover, at this time, the local anchor management unit 345 generates an anchor by associating virtual content and a feature point of the real space.

In step S640, the local anchor management unit 345 transmits a request for registering the generated anchor to the anchor management unit 331.

In step S641, the MR space management system 122 returns a notification that the anchor management unit 331 has completed reception to the local anchor management unit 345.

In step S642, the anchor management unit 331 registers the received anchor in the anchor information of Table 5 as a result of a request related to step S640.

In step S643, the local anchor management unit 345 of the MR client terminal 134, the MR client terminal 135, or MR client terminal 136 of the user A transmits a request for acquiring an anchor to the anchor management unit 331.

In step S644, the anchor management unit 331 returns the anchor to the local anchor management unit 345.

In step S645, the local anchor management unit 345 of the MR client terminals 134 to 136 of the user D transmits an anchor acquisition request to the anchor management unit 331.

In step S646, the anchor management unit 331 returns the anchor to the local anchor management unit 345.

In step S616, the MR cooperation management unit 326 of the VR client terminal 131 or the like of the user A requests the cooperation management unit 336 of the MR space management system 122 to register an anchor of the virtual content managed by the local virtual content management unit 323.

In step S617, upon receiving the request for registering the anchor, the cooperation management unit 336 generates and registers the anchor in the anchor information of Table 5 based on the virtual content information via the anchor management unit 331.

In step S618, the cooperation management unit 336 returns a notification that an anchor registration has been completed to the MR cooperation management unit 326. Here, when an anchor is generated in S617 and the anchor is registered, when the cooperation management unit 336 generates the two-dimensional barcode described in FIG. 3 as the feature amount of the anchor, the cooperation management unit 336 returns the two-dimensional barcode generated in S618 to the MR cooperation management unit 326.

Step S647 to step S648 are the same operations as step S643 to step S644.

In step S649, the local anchor management unit 345 of the MR client terminal 134 or the like of the user A updates the anchor information acquired in steps S647 and S648, and transmits a request for updating the anchor to the anchor management unit 331.

In step S650, the anchor management unit 331 returns a notification that the reception has been completed to the local anchor management unit 345.

In steps S651 to S652, the same operations as those in S645 to S646 are performed.

In the present embodiment, the MR client terminal 134 of the user A logs in in steps S631 and S632. After that, it is assumed that the MR client terminal 134 and the like of the user A make a request to periodically acquire the anchor in steps S635 and S636, steps S643 and S644, and steps S647 and S648.

Similarly, the client terminal 134 of the user D logs in in steps S633 and S634. After that, it is assumed that the client terminal 134 of the user D makes a request for periodically acquiring an anchor in steps S637 and S638, steps S645 and S646, and steps S651 and S652. As another example, the MR client terminal 134, the MR client terminal 135, or the MR client terminal 136 of the user A or the user D may randomly make a request for acquiring virtual content.

Here, specific processing content of steps S616 to S618 and steps S647 to S649 will be described with reference to FIGS. 9 to 12, respectively.

Figure 9:
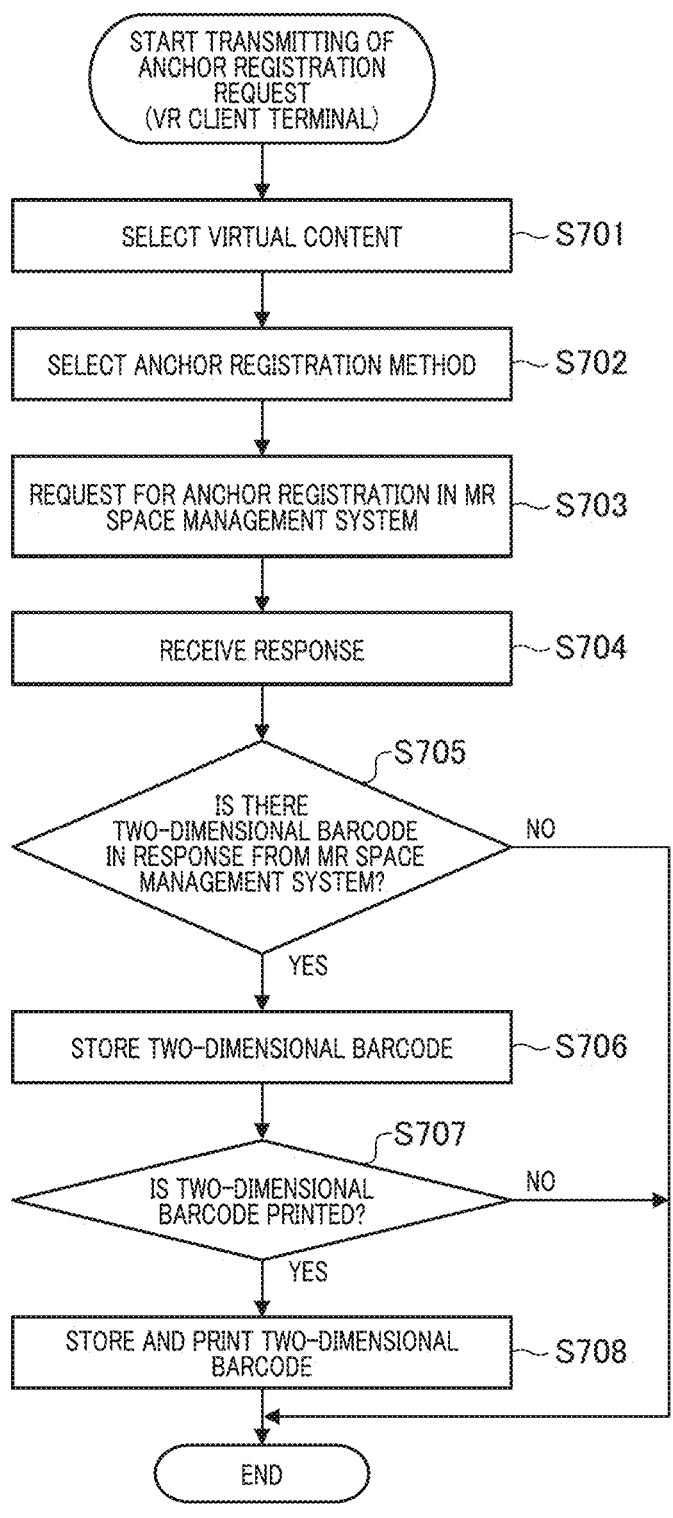
FIG. 9 is a flowchart which shows an example of processing for the VR client terminal requesting the registration of an anchor from the MR space management system in the embodiment.

FIG. 9 is a flowchart which shows an example of processing for the VR client terminal requesting for anchor registration from the MR space management system in the embodiment. Specifically, FIG. 9 is a flowchart which shows an example of the processing executed by the VR client terminal 131, the VR client terminal 132, or the VR client terminal 133 in steps S616 to S618.

In step S701, the MR cooperation management unit 326 selects the virtual content managed by the local virtual content management unit 323 based on an instruction of the user received via the display unit 321.

In step S702, the MR cooperation management unit 326 selects a method for registering an anchor based on an instruction of the user received via the display unit 321. Here, the method of registering an anchor is a method of setting the feature amount of the real space in association with the virtual content when an anchor is generated and registered in the MR space management system 122. The setting method of this feature amount includes two-dimensional barcode generation, a registered anchor use, and being indefinite. The setting method of these three feature amounts shows settings for the feature amounts of the generated two-dimensional barcode, the feature amount of the registered anchor, and the unstored (indefinite) feature amount, which are as described in description using Table 5.

In step S703, the MR cooperation management unit 326 includes an anchor registration method of the virtual content selected in step S701 and step S702 in a request via the data communication unit 342. Then, the MR cooperation management unit 326 transmits a request for registering the anchor to the anchor management unit 331 of the MR space management system 122.

In step S704, the MR cooperation management unit 326 receives a response to an anchor registration request from the MR space management system 122.

In step S705, the MR cooperation management unit 326 determines whether the response from the MR space management system 122 includes a two-dimensional barcode. When the MR cooperation management unit 326 determines that a two-dimensional barcode is present in the response from the MR space management system 122 (YES in step S705), the processing proceeds to step S706. On the other hand, when the MR cooperation management unit 326 determines that the response from the MR space management system 122 does not include a two-dimensional barcode (NO in step S705), the processing is ended.

In step S706, the MR cooperation management unit 326 stores the received two-dimensional barcode in the HDD 205. Here, the two-dimensional barcode may be stored by adding a two-dimensional barcode column to the virtual content management table in Table 2, or stored and managed in association with the virtual content and the two-dimensional barcode in a separate table.

In step S707, the MR cooperation management unit 326 determines whether to print a two-dimensional barcode. When the MR cooperation management unit 326 determines to print a two-dimensional barcode (YES in step S707), it advances the processing to step S708. On the other hand, when the MR cooperation management unit 326 determines not to print the two-dimensional barcode (NO in step S707), the processing is ended without printing the two-dimensional barcode.

In step S708, the MR cooperation management unit 326 stores and prints the two-dimensional barcode.

Figure 10:
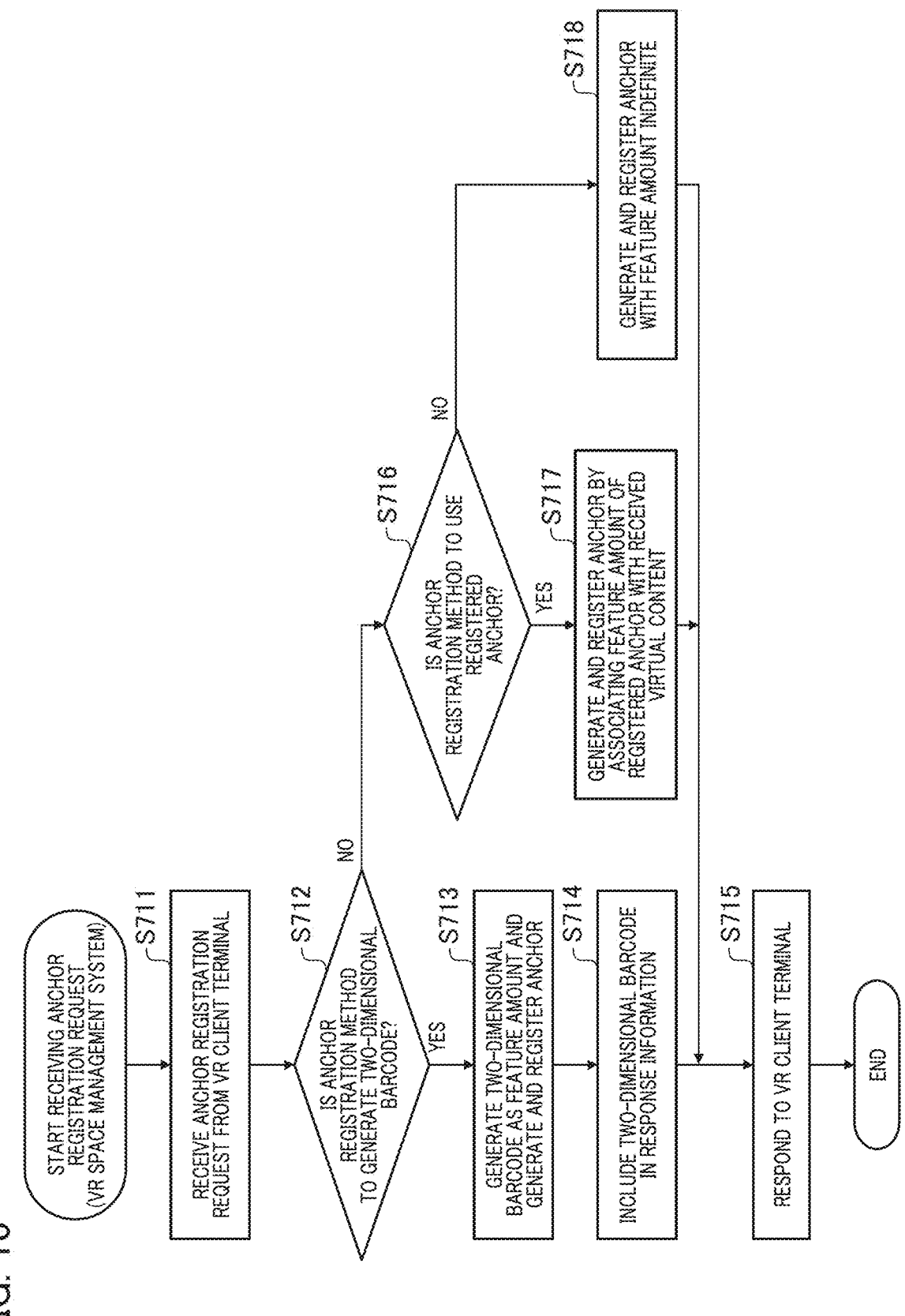
FIG. 10 is a flowchart which shows an example of processing for the VR client terminal requesting the registration of an anchor from the MR space management system in the embodiment.

FIG. 10 is a flowchart which shows an example of processing for the VR client terminal requesting anchor registration from the MR space management system in the embodiment. Specifically; FIG. 10 is a flowchart which shows an example of the processing executed by the MR space management system 122 from step S616 to step S618.

In step S711, the cooperation management unit 336 receives a request for registering an anchor from the MR cooperation management unit 326 of the VR client terminal 131, the VR client terminal 132, or the VR client terminal 133 via the data communication unit 332.

In step S712, the cooperation management unit 336 determines whether the method for registering an anchor is to generate a two-dimensional barcode. When the cooperation management unit 336 determines that the method for registering an anchor is to generate a two-dimensional barcode (YES in step S712), the processing proceeds to step S713. On the other hand, when the cooperation management unit 336 determines that the method for registering an anchor is not to generate a two-dimensional barcode (NO in step S712), the processing proceeds to step S716.

In step S713, the cooperation management unit 336 generates a new two-dimensional barcode and generates an anchor by associating it with the virtual content. Then, the cooperation management unit 336 registers a corresponding anchor in the anchor information via the anchor management unit 331 in Table 5. Here, when the cooperation management unit 336 generates an anchor in S713, it generates an anchor by adding "O" to a temporary anchor column of the anchor information in Table 5.

In step S714, the cooperation management unit 336 includes a two-dimensional barcode in the response to the request for registering an anchor.

In step S715, the cooperation management unit 336 responds to the MR cooperation management unit 326 of the VR client terminal 131, the VR client terminal 132, or the VR client terminal 133 via the data communication unit 332.

In step S716, the cooperation management unit 336 determines whether the method for registering an anchor is to use a registered anchor. When the cooperation management unit 336 determines that the method for registering an anchor is to use a registered anchor (YES in step S716), the processing proceeds to step S717. On the other hand, when the cooperation management unit 336 determines that the method for registering an anchor is not to use a registered anchor (NO in step S716), the processing proceeds to step S718.

In step S717, the cooperation management unit 336 selects one arbitrary anchor from among the registered anchors, and generates another new anchor by associating the feature amount of the selected anchor with the virtual content. Then, the cooperation management unit 336 registers an anchor in the anchor information in Table 5 via the anchor management unit 331. A method for selecting one arbitrary anchor from the registered anchors is, for example, to automatically select an anchor with the latest update date and time by the cooperation management unit 336 among the anchors owned by a user of the VR client terminal 131 that has requested to register an anchor.

As another example, an unillustrated sequence is added between the cooperation management unit 336 and the MR cooperation management unit 326, and a list of selectable anchors may be transmitted to the VR client terminal 131 and the like and presented to the user by the cooperation management unit 336. At this time, the user may be selectable via the display unit 321 in the MR cooperation management unit 326 such as the VR client terminal 131, or one arbitrary anchor may be selected using another method.

In step S718, the cooperation management unit 336 generates and registers an anchor with the feature amount unstored (indefinite).

Here, in step S713, step S717, and step S718, generation of an anchor by each method of registering an anchor has been mentioned. When an anchor is generated using these methods, in the present embodiment, although it is assumed to register that the session ID is indefinite, the virtual content positional information is (0, 0, 0), and the sensor information is indefinite in the anchor information in Table 5, another means may also be used. For example, it may be automatically registered based on the anchor information in which a corresponding user is an owner, or the user may be able to be set using the VR client terminal 131 or the like using a sequence or means not shown.

Figure 11:
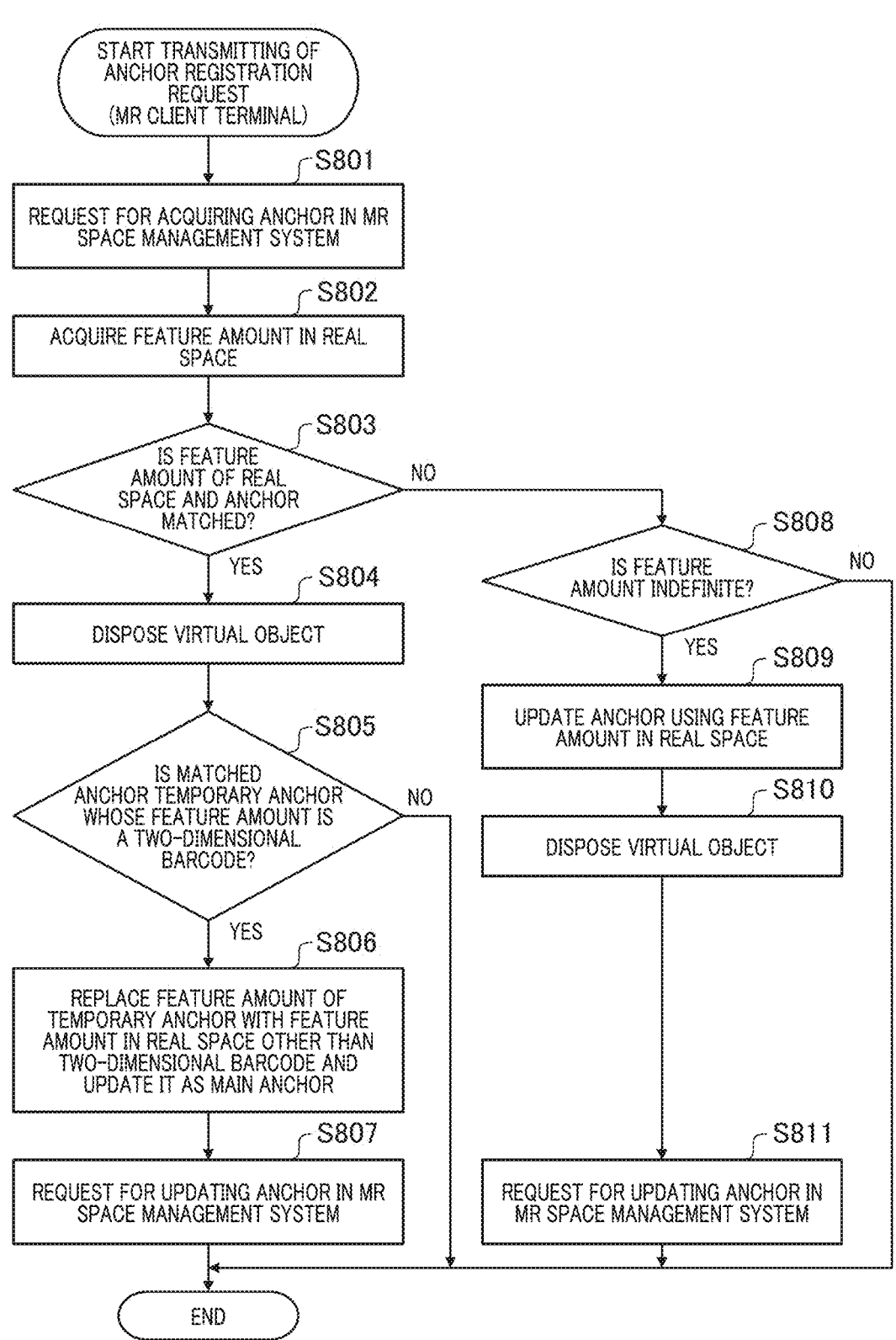
FIG. 11 is a flowchart which shows an example of processing in which the MR client terminal according to the embodiment acquires an anchor on the MR space management system for which registration is requested by the VR client terminal.

FIG. 11 is a flowchart which shows an example of processing in which the MR client terminal according to the embodiment acquires an anchor on the MR space management system for which registration is requested by the VR client terminal. Specifically, FIG. 11 is a flowchart which shows an example of the processing executed by the MR client terminal 134, the MR space management system 135, or the MR space management system 136 in steps S647 to S649.

In step S801, the local anchor management unit 345 transmits a request for acquiring an anchor to the anchor management unit 331 of the MR space management system 122 via the data communication unit 342.

In step S802, the local anchor management unit 345 uses the camera 207 to acquire the feature amount of the real space.

In step S803, the local anchor management unit 345 determines whether the feature amounts of the real space and the anchor match. When the local anchor management unit 345 determines that the feature amounts of the real space and the anchor match (YES in step S803), the local anchor management unit 345 advances the processing to step S804. On the other hand, when the local anchor management unit 345 determines that the feature amounts of the real space and the anchor do not match (NO in step S803), the local anchor management unit 345 advances the processing to step S808.

In step S804, the local anchor management unit 345 superimposes the virtual content on the real space based on the anchor information.

In step S805, the local anchor management unit 345 determines whether the matched anchor is a temporary anchor whose feature amount is a two-dimensional barcode. When the local anchor management unit 345 determines that the matched anchor is a temporary anchor whose feature amount is a two-dimensional barcode (YES in step S805), the processing proceeds to step S806. In addition, in this case, a corresponding anchor is a temporary anchor. On the other hand, when the local anchor management unit 345 determines that the matched anchor is not a temporary anchor whose feature amount is a two-dimensional barcode (NO in step S805), the processing is ended.

In step S806, the local anchor management unit 345 updates the feature amount of an anchor determined to be matched in step S803 using a feature amount other than the feature amount of the two-dimensional barcode among the feature amount of the real space acquired using the camera 207. Furthermore, the local anchor management unit 345 deletes "O" in a temporary anchor column given to the anchor information of Table 5 of a corresponding anchor, and sets it as a main anchor.

In step S807, the local anchor management unit 345 transmits a request for updating the anchor to the anchor management unit 331 of the MR space management system 122 via the data communication unit 342.

In step S808, the local anchor management unit 345 determines whether the feature amount of the anchor acquired in step S801 is indefinite. When the local anchor management unit 345 determines that the feature amount of the anchor acquired in step S801 is indefinite (YES in step S808), the local anchor management unit 345 advances the processing to step S809. On the other hand, when the local anchor management unit 345 determines that the feature amount of the anchor acquired in step S801 is not indefinite (NO in step S808), the processing is ended.

In step S809, the local anchor management unit 345 updates the feature amount of the anchor whose feature amount is indefinite with the feature amount of the real space acquired using the camera 207.

In step S810, the local anchor management unit 345 disposes virtual content of a corresponding anchor.

In step S811, the local anchor management unit 345 transmits a request for updating the anchor to the anchor management unit 331 of the MR space management system 122 via the data communication unit 342.

Figure 12:
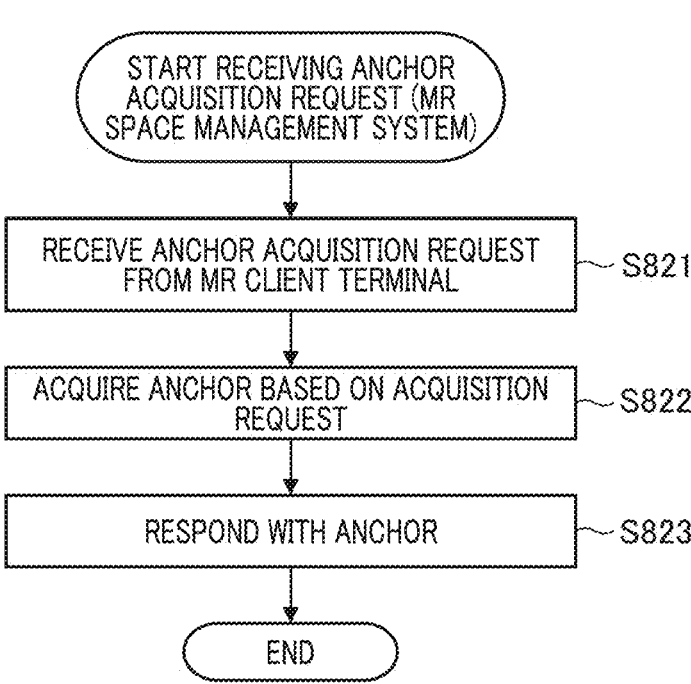
FIG. 12 is a flowchart which shows an example of processing in which the MR client terminal according to the embodiment acquires an anchor on the MR space management system for which registration is requested by the VR client terminal.

FIG. 12 is a flowchart which shows an example of processing in which the MR client terminal according to the embodiment acquires an anchor on the MR space management system for which registration is requested by the VR client terminal. Specifically. FIG. 12 is a diagram which shows an example of the processing executed by the MR space management system 122 in steps S647 to S649.

In step S821, the anchor management unit 331 receives a request for acquiring an anchor from the local anchor management unit 345 of the MR client terminal 134, the MR client terminal 135, or the MR client terminal 1356 via the data communication unit 332.

In step S822, the anchor management unit 331 acquires an anchor from the anchor information in Table 5 based on the received request for acquiring the received anchor.

In step S823, the anchor management unit 331 responds with an anchor to the local anchor management unit 345 of the MR client terminal 134, the MR client terminal 135, or the MR client terminal 136 via the data communication unit 332, and ends the processing.

The system and the method according to the embodiment have been described above. The system has management means for managing virtual content in association with a purchaser of virtual content. When a terminal detects a code corresponding to the virtual content, the management means further associates a feature amount acquired from the real space by the terminal with the virtual content, and controls the terminal to project the virtual content into a field of view of a user of the terminal. In addition, the management means further associates the feature amount, which is a two-dimensional barcode, with the virtual content. In addition, the management means further associates the feature amount registered in the space management system with the virtual content. Moreover, the management means associates an indefinite feature amount indicating that a feature is indefinite with first virtual content that is at least a part of the virtual content, and associates a feature amount acquired from the real space by the terminal with the indefinite feature amount. Furthermore, virtual content may also be a user interface. Through the processing described above, the system and the method according to the embodiment can make it possible to use virtual content such as a user interface related to at least one of specific functions and services provided in the VR space also in the MR space.

OTHER EMBODIMENT

The preferred embodiments of the present disclosure have been described above. However, the present disclosure is not limited to the embodiments described above. That is, the present disclosure includes embodiments in which various modifications are made based on the spirit of the present disclosure, and these embodiments are not excluded from the scope of the present disclosure.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-051529, filed Mar. 28, 2023, which is hereby incorporated by reference wherein in its entirety.

What is claimed is:

1. A content management system comprising:

a management table that manages virtual content;

one or more memories storing instructions; and one or more processors executing the instructions causing the content management system to:

receive a request for an anchor registration for disposing the virtual content from a terminal;

register a temporary anchor information associated with the virtual content in the management table;

transmit a response that includes code data to the terminal; and receive an update request that includes a feature amount of a real space by an augmented reality (AR) client or a mixed reality (MR) client, wherein the feature amount of the real space is acquired when the virtual content is disposed in the real space using a printed matter of the code data received by the terminal, wherein the acquired feature amount is stored in the management table instead of the temporary anchor information.

2. The content management system according to claim 1, wherein the virtual content is a virtual pet that a purchaser of the virtual content is able to keep via the terminal.

3. A content management method using one or more memory storing instructions and one or more processors executing the instructions, causing the content management method comprising:

providing a management table that manages virtual content;

receiving a request for an anchor registration for disposing virtual content from a terminal;

registering a temporary anchor information associated with the virtual content in the management table;

transmitting a response that includes code data to the terminal; and receiving an update request that includes a feature amount of a real space by an augmented reality (AR) client or a mixed reality (MR) client, wherein the feature amount of the real space is acquired when the virtual content is disposed in the real space using a printed matter of the code data received by the terminal, and wherein the acquired feature amount is stored in the management table instead of the temporary anchor information.

* * * * *